United States Patent [19]
Inoue

[11] Patent Number: 5,920,352
[45] Date of Patent: Jul. 6, 1999

[54] IMAGE MEMORY STORAGE SYSTEM AND METHOD FOR A BLOCK ORIENTED IMAGE PROCESSING SYSTEM

[75] Inventor: Shuji Inoue, Osaka, Japan

[73] Assignee: Matsushita Electric Industrial Co., Ltd., Osaka, Japan

[21] Appl. No.: 08/706,189

[22] Filed: Aug. 30, 1996

Related U.S. Application Data

[63] Continuation-in-part of application No. 08/330,579, Oct. 28, 1994, Pat. No. 5,623,311.

[51] Int. Cl.$^6$ .............................. H04N 7/18; G06K 9/20
[52] U.S. Cl. ....................... 348/384; 348/716; 348/717; 348/718; 382/232
[58] Field of Search .................................. 382/232, 233, 382/234, 235, 236, 237, 238, 239, 302, 303, 304, 305; 348/384, 402, 405, 415, 416, 419, 420, 699, 700, 714, 715, 716, 717, 718, 719, 396, 395, 397

[56] References Cited

U.S. PATENT DOCUMENTS

| | | |
|---|---|---|
| 4,698,674 | 10/1987 | Bloom . |
| 4,758,881 | 7/1988 | Laspada . |
| 4,825,287 | 4/1989 | Baji et al. . |
| 4,924,307 | 5/1990 | Landowski et al. . |
| 5,136,662 | 8/1992 | Maruyama et al. . |
| 5,170,259 | 12/1992 | Niihara . |
| 5,239,628 | 8/1993 | Hasebe et al. . |
| 5,253,041 | 10/1993 | Wine et al. . |
| 5,267,334 | 11/1993 | Normille et al. . |
| 5,298,997 | 3/1994 | Manabe . |
| 5,311,309 | 5/1994 | Ersoz et al. . |
| 5,329,365 | 7/1994 | Uz . |
| 5,365,272 | 11/1994 | Siracusa . |
| 5,369,444 | 11/1994 | Ersoz et al. . |
| 5,373,323 | 12/1994 | Kwon . |
| 5,376,969 | 12/1994 | Zdepski . |
| 5,379,351 | 1/1995 | Fandrianto et al. . |
| 5,379,356 | 1/1995 | Purcell et al. . |
| 5,386,237 | 1/1995 | Knee . |
| 5,398,072 | 3/1995 | Auld . |
| 5,426,463 | 6/1995 | Reininger et al. . |
| 5,479,212 | 12/1995 | Kurobe et al. . |
| 5,583,572 | 12/1996 | Sumihiro ................................. 348/396 |
| 5,594,813 | 1/1997 | Fandrianto et al. ..................... 382/236 |
| 5,623,311 | 4/1997 | Phillips et al. ............................ 348/396 |
| 5,654,773 | 8/1997 | Kajimoto et al. ........................ 348/717 |
| 5,717,461 | 2/1998 | Hoogenboom .......................... 348/716 |

OTHER PUBLICATIONS

IBM Second Edition, "IBM MPEG-2 Decoder Chip User's Guide", Jun. 1994.
SGS—Thomson Microelectronics, "MPEG-2/CCIR 601 Video Decoder", Jul. 1994, pp. 1–84.
"Advanced Information", *RDRAM Reference Manual*, pp. 3–7 and 12.

*Primary Examiner*—Bryan Tung
*Attorney, Agent, or Firm*—Ratner & Prestia

[57] ABSTRACT

A multi-channel memory system for holding video image data employs a particular form of interleaving in each channel to achieve optimum performance. Data representing luminance and chrominance components are written into the memory in respectively different channels such that the luminance information occupies one part of a memory row while the chrominance information occupies another part. The channel assignment is cycled within a memory row and is changed from one row of the memory to the next such that all luminance information in the row is contiguous and all chrominance information is contiguous yet luminance information and its corresponding chrominance information may be accessed in a single operation using all three channels. The memory is organized in three channels, each channel including two devices and each device including two banks. In addition to the interleaving of the channels, memory rows holding image data which are adjacent on the screen are stored in respectively different banks and devices such that this adjacent data may be accessed quickly.

11 Claims, 16 Drawing Sheets

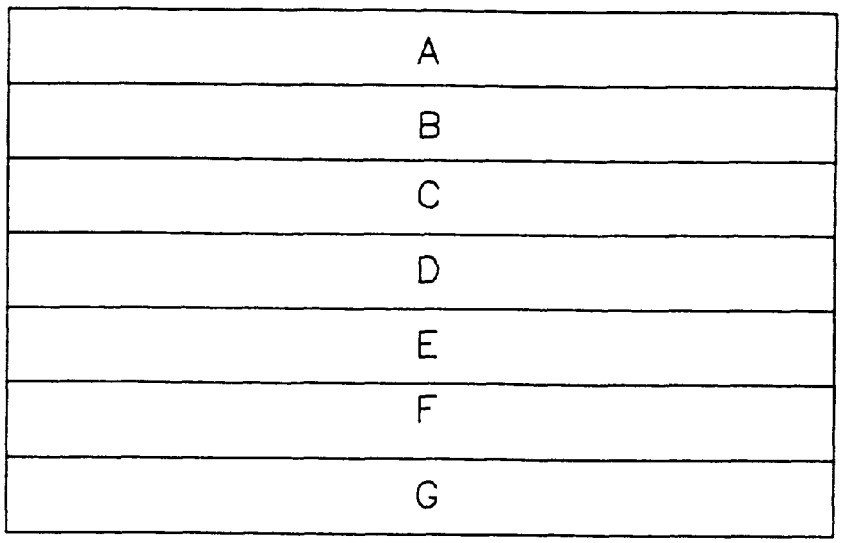
FIG. IA
PRIOR ART
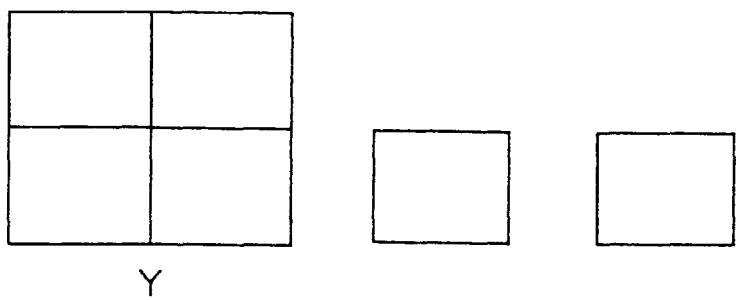
FIG. IB
PRIOR ART
FIG. IC
PRIOR ART

| ROW0 FIELD A0 ROW67 |
|---|
| ROW68 FIELD A1 ROW135 |
| ROW136 FIELD B0 ROW203 |
| ROW204 FIELD B1 ROW271 |
| ROW272 FIELD C0 ROW339 |
| ROW340 FIELD C1 ROW407 |
| ROW408 VBV BUFFER etc. ROW511 |

| 0 | 16 | 32 | 48 | 64 | 80 | 96 | 112 | 128 | 144 | 160 | 176 | 192 | 208 | 224 | 240 |
|---|----|----|----|----|----|----|-----|-----|-----|-----|-----|-----|-----|-----|-----|
| 1 | 17 | 33 | 49 | 65 | 81 | 97 | 113 | 129 | 145 | 161 | 177 | 193 | 209 | 225 | 241 |
| 2 | 18 | 34 | 50 | 66 | 82 | 98 | 114 | 130 | 146 | 162 | 178 | 194 | 210 | 226 | 242 |
| 3 | 19 | 35 | 51 | 67 | 83 | 99 | 115 | 131 | 147 | 163 | 179 | 195 | 211 | 227 | 243 |
| 4 | 20 | 36 | 52 | 68 | 84 | 100 | 116 | 132 | 148 | 164 | 180 | 196 | 212 | 228 | 244 |
| 5 | 21 | 37 | 53 | 69 | 85 | 101 | 117 | 133 | 149 | 165 | 181 | 197 | 213 | 229 | 245 |
| 6 | 22 | 38 | 54 | 70 | 86 | 102 | 118 | 134 | 150 | 166 | 182 | 198 | 214 | 230 | 246 |
| 7 | 23 | 39 | 55 | 71 | 87 | 103 | 119 | 135 | 151 | 167 | 183 | 199 | 215 | 231 | 247 |
| 8 | 24 | 40 | 56 | 72 | 88 | 104 | 120 | 136 | 152 | 168 | 184 | 200 | 216 | 232 | 248 |
| 9 | 25 | 41 | 57 | 73 | 89 | 105 | 121 | 137 | 153 | 169 | 185 | 201 | 217 | 233 | 249 |
| 10 | 26 | 42 | 58 | 74 | 90 | 106 | 122 | 138 | 154 | 170 | 186 | 202 | 218 | 234 | 250 |
| 11 | 27 | 43 | 59 | 75 | 91 | 107 | 123 | 139 | 155 | 171 | 187 | 203 | 219 | 235 | 251 |
| 12 | 28 | 44 | 60 | 76 | 92 | 108 | 124 | 140 | 156 | 172 | 188 | 204 | 220 | 236 | 252 |
| 13 | 29 | 45 | 61 | 77 | 93 | 109 | 125 | 141 | 157 | 173 | 189 | 205 | 221 | 237 | 253 |
| 14 | 30 | 46 | 62 | 78 | 94 | 110 | 126 | 142 | 158 | 174 | 190 | 206 | 222 | 238 | 254 |
| 15 | 31 | 47 | 63 | 79 | 95 | 111 | 127 | 143 | 159 | 175 | 191 | 207 | 223 | 239 | 255 |
| ABC | ABC | ABC | ABC | ABC | ABC | ABC | ABC | ABC | ABC | ABC | BAC | BAC | BAC | BAC | BAC |
| ABC | ABC | ABC | ABC | ABC | ABC | ABC | ABC | ABC | ABC | ABC | BAC | BAC | BAC | BAC | BAC |
| ABC | ABC | ABC | ABC | ABC | ABC | ABC | ABC | ABC | ABC | ABC | BAC | BAC | BAC | BAC | BAC |
| ABC | ABC | ABC | ABC | ABC | ABC | ABC | ABC | ABC | ABC | ABC | BAC | BAC | BAC | BAC | BAC |
| ABC | ABC | ABC | ABC | ABC | ABC | ABC | ABC | ABC | ABC | ABC | BAC | BAC | BAC | BAC | BAC |
| ABC | ABC | ABC | ABC | ABC | ABC | ABC | ABC | ABC | ABC | ABC | BAC | BAC | BAC | BAC | BAC |
| ABC | ABC | ABC | ABC | ABC | ABC | ABC | ABC | ABC | ABC | ABC | BAC | BAC | BAC | BAC | BAC |
| ABC | ABC | ABC | ABC | ABC | ABC | ABC | ABC | ABC | ABC | ABC | BAC | BAC | BAC | BAC | BAC |
| ABC | ABC | ABC | ABC | ABC | ABC | ABC | ABC | ABC | ABC | ABC | BAC | BAC | BAC | BAC | BAC |
| ABC | ABC | ABC | ABC | ABC | ABC | ABC | ABC | ABC | ABC | ABC | BAC | BAC | BAC | BAC | BAC |
| ABC | ABC | ABC | ABC | ABC | ABC | ABC | ABC | ABC | ABC | ABC | BAC | BAC | BAC | BAC | BAC |
| ABC | ABC | ABC | ABC | ABC | ABC | ABC | ABC | ABC | ABC | ABC | BAC | BAC | BAC | BAC | BAC |
| ABC | ABC | ABC | ABC | ABC | ABC | ABC | ABC | ABC | ABC | ABC | BAC | BAC | BAC | BAC | BAC |
| ABC | ABC | ABC | ABC | ABC | ABC | ABC | ABC | ABC | ABC | ABC | BAC | BAC | BAC | BAC | BAC |
| ABC | ABC | ABC | ABC | ABC | ABC | ABC | ABC | ABC | ABC | ABC | BAC | BAC | BAC | BAC | BAC |
| ABC | ABC | ABC | ABC | ABC | ABC | ABC | ABC | ABC | ABC | ABC | BAC | BAC | BAC | BAC | BAC |

| 1002 | | | | 1010 | 1004 | | |
|---|---|---|---|---|---|---|---|
| D0:R0:C | D0:R0:B | D0:R0:A | D0:R0:C | D0:R1:B | D0:R1:A | D0:R1:C | D0:R1:B |
| D0:R0:C | D0:R0:B | D0:R0:A | D0:R0:C | D0:R1:B | D0:R1:A | D0:R1:C | D0:R1:B |
| D0:R0:C | D0:R0:B | D0:R0:A | D0:R0:C | D0:R1:B | D0:R1:A | D0:R1:C | D0:R1:B |
| D0:R0:C | D0:R0:B | D0:R0:A | D0:R0:C | D0:R1:B | D0:R1:A | D0:R1:C | D0:R1:B |
| D0:R0:C | D0:R0:B | D0:R0:A | D0:R0:C | D0:R1:B | D0:R1:A | D0:R1:C | D0:R1:B |
| D0:R0:C | D0:R0:B | D0:R0:A | D0:R0:C | D0:R1:B | D0:R1:A | D0:R1:C | D0:R1:B |
| D0:R0:C | D0:R0:B | D0:R0:A | D0:R0:C | D0:R1:B | D0:R1:A | D0:R1:C | D0:R1:B |
| D0:R0:C | D0:R0:B | D0:R0:A | D0:R0:C | D0:R1:B | D0:R1:A | D0:R1:C | D0:R1:B |
| D1:R0:C | D1:R0:B | D1:R0:A | D1:R0:C | D1:R1:B | D1:R1:A | D1:R1:C | D1:R1:B |
| D1:R0:C | D1:R0:B | D1:R0:A | D1:R0:C | D1:R1:B | D1:R1:A | D1:R1:C | D1:R1:B |
| D1:R0:C | D1:R0:B | D1:R0:A | D1:R0:C | D1:R1:B | D1:R1:A | D1:R1:C | D1:R1:B |
| D1:R0:C | D1:R0:B | D1:R0:A | D1:R0:C | D1:R1:B | D1:R1:A | D1:R1:C | D1:R1:B |
| D1:R0:C | D1:R0:B | D1:R0:A | D1:R0:C | D1:R1:B | D1:R1:A | D1:R1:C | D1:R1:B |
| D1:R0:C | D1:R0:B | D1:R0:A | D1:R0:C | D1:R1:B | D1:R1:A | D1:R1:C | D1:R1:B |
| D1:R0:C | D1:R0:B | D1:R0:A | D1:R0:C | D1:R1:B | D1:R1:A | D1:R1:C | D1:R1:B |
| D1:R0:C | D1:R0:B | D1:R0:A | D1:R0:C | D1:R1:B | D1:R1:A | D1:R1:C | D1:R1:B |

| 1002 | | | | 1012 | 1004 | | |
|---|---|---|---|---|---|---|---|
| D0:R0:B | D0:R0:C | D0:R0:A | D0:R0:B | D0:R1:C | D0:R1:A | D0:R1:B | D0:R1:C |
| D0:R0:B | D0:R0:C | D0:R0:A | D0:R0:B | D0:R1:C | D0:R1:A | D0:R1:B | D0:R1:C |
| D0:R0:B | D0:R0:C | D0:R0:A | D0:R0:B | D0:R1:C | D0:R1:A | D0:R1:B | D0:R1:C |
| D0:R0:B | D0:R0:C | D0:R0:A | D0:R0:B | D0:R1:C | D0:R1:A | D0:R1:B | D0:R1:C |
| D0:R0:B | D0:R0:C | D0:R0:A | D0:R0:B | D0:R1:C | D0:R1:A | D0:R1:B | D0:R1:C |
| D0:R0:B | D0:R0:C | D0:R0:A | D0:R0:B | D0:R1:C | D0:R1:A | D0:R1:B | D0:R1:C |
| D0:R0:B | D0:R0:C | D0:R0:A | D0:R0:B | D0:R1:C | D0:R1:A | D0:R1:B | D0:R1:C |
| D0:R0:B | D0:R0:C | D0:R0:A | D0:R0:B | D0:R1:C | D0:R1:A | D0:R1:B | D0:R1:C |
| D1:R0:B | D1:R0:C | D1:R0:A | D1:R0:B | D1:R1:C | D1:R1:A | D1:R1:B | D1:R1:C |
| D1:R0:B | D1:R0:C | D1:R0:A | D1:R0:B | D1:R1:C | D1:R1:A | D1:R1:B | D1:R1:C |
| D1:R0:B | D1:R0:C | D1:R0:A | D1:R0:B | D1:R1:C | D1:R1:A | D1:R1:B | D1:R1:C |
| D1:R0:B | D1:R0:C | D1:R0:A | D1:R0:B | D1:R1:C | D1:R1:A | D1:R1:B | D1:R1:C |
| D1:R0:B | D1:R0:C | D1:R0:A | D1:R0:B | D1:R1:C | D1:R1:A | D1:R1:B | D1:R1:C |
| D1:R0:B | D1:R0:C | D1:R0:A | D1:R0:B | D1:R1:C | D1:R1:A | D1:R1:B | D1:R1:C |
| D1:R0:B | D1:R0:C | D1:R0:A | D1:R0:B | D1:R1:C | D1:R1:A | D1:R1:B | D1:R1C |
| D1:R0:B | D1:R0:C | D1:R0:A | D1:R0:B | D1:R1:C | D1:R1:A | D1:R1:B | D1:R1:C |

IMAGE MEMORY STORAGE SYSTEM AND METHOD FOR A BLOCK ORIENTED IMAGE PROCESSING SYSTEM

This application is a continuation in part of U.S. patent application Ser. No. 08/330,579 for MPEG VIDEO DECODER HAVING A HIGH BANDWIDTH MEMORY filed on Oct. 28, 1994, now U.S. Pat. No. 5,623,311.

FIELD OF THE INVENTION

The present invention relates to memory storage systems and in particular to a data memory configured to hold a block-oriented image.

BACKGROUND OF THE INVENTION

Systems which process image data for display come in many forms. These include video games which construct images from preexisting data, medical diagnostic systems which faithfully reproduce medical imaging data, and video decompression systems which decode encoded video information and process it to produce successive images for display. Each of these systems has a common component: a memory in which data representing image information is stored prior to display. Many image processing systems store more than one image, an input image and an output image. The input image may be processed, for example, to add visual features corresponding to a player of a video game, to electronically enhance components of a medical image, or for use in decoding a later occurring motion compensated encoded image.

Many image processing systems use block-oriented algorithms. These algorithms allow an image to be decomposed into smaller pieces (i.e. blocks) and the blocks to be processed individually. Significant time savings can be achieved by parallel processing pixels in an image block. Because they are processed in parallel, however, entire blocks of pixels may be available for storage and processing in relatively brief time interval.

Thus, memory systems used in block-oriented image processing apparatus should be able to fetch and store entire blocks of data quickly. This process may be complicated where block boundaries are not fixed. For example, when processing a motion compensated image the decoded data may represent differences between pixels in a block at one time and pixels in a block at a previous time. In this instance, pixels of the prior block are held in memory and fetched in order to complete the decoding process of the newly available pixels. Often, in order to obtain the best matching block pixels, the prior block is taken from a different position in the image than that occupied by the newly received block. The boundaries of this reference block may be shifted with respect to the other blocks stored in the memory. Thus, the reference block may contain pixels from portions of several blocks in the stored image.

Other types of image processing such as interpolation may also use pixels from adjacent blocks to form a single block of the output image. One form of image interpolation which is commonly used for decoding a high definition video signal, is to define a reference block which is displaced by one-half pixel from a block that is stored in the image memory. To regenerate the reference block having a resolution of one-half pixel position, a set of pixels which is larger than one block must be accessed. Thus, the image memory should not be limited to accessing single blocks of pixels.

Another image processing problem which impacts on the structure and organization of an image memory is multi-component image data. For example, compressed video images may include separate luminance and chrominance components because chrominance information may be compressed to a greater degree than the luminance information without perceptively degrading the image. When an image is decoded and displayed, the luminance and chrominance components are processed together and displayed together. During image processing, however, it may be desirable to process the luminance components separately from the chrominance components. This puts added constraints on the image memory system, because luminance and chrominance components from separate blocks may need to be accessed together in some processing steps and separately in other processing steps.

An example of an image processing system which uses many of these techniques is an MPEG-2 decoder which decodes image data in 4:2:0 macro block format. FIG. 1A is a graphical depiction of such an image which shows how the image is divided into slices. In FIG. 1A, each of the blocks labeled A through G is a separate slice of an image. Each slice is composed of macroblocks. An exemplary macroblock is shown in FIG. 1B. This macroblock is in 4:2:0 format and so it has four eight-pixel by eight-pixel luminance blocks and two eight-pixel by eight-pixel chrominance blocks, one for the Cb color difference signal and the other for the Cr difference signal.

When the image is received and decoded, the blocks occur in the sequence shown in FIG. 1C, that is to say, four luminance blocks, one Cb color difference block and one Cr color difference block. Image data is fetched from memory for display in the same order. In the display processor, each of the Cb and Cr blocks is expanded to four blocks and combined with respective ones of the four luminance blocks to regenerate a color image.

During image processing, however, the luminance and chrominance data may be accessed in blocks that do not conform to block boundaries. This is illustrated in FIGS. 1D and 1E. In FIG. 1D a reference block 110 is formed from parts of four other blocks 112, 114, 116 and 118. Thus, the boundaries of this reference block do not correspond to the boundaries of the image blocks that were stored in the memory when the image was decoded. Consequently, if the memory is arranged to access image blocks having fixed addresses, up to four image blocks may need to be accessed in order to regenerate the block 110.

FIG. 1E illustrates another image processing technique that is used in MPEG decoders. According to this technique a block 122 is regenerated, which not only does not align itself with image block boundaries, but does not align itself with pixel boundaries either. As shown in FIG. 1E, this block is displaced both horizontally and vertically by one half-pixel position from block 110, shown in FIG. 1D. To regenerate block 122, a number of pixels larger than is contained in a single block must be accessed. This is illustrated by the nine pixel by nine pixel block 120 of FIG. 1E. As shown in FIG. 1E, it is desirable for an MPEG decoder to be able to access image data in blocks which are larger than the eight by eight pixel block size used by the MPEG-2 algorithm.

SUMMARY OF THE INVENTION

The present invention is embodied in a multi-channel memory system in which data in each channel are interleaved. Data representing respective image components are written into the memory in respectively different channels. The channel assignment is changed from one row of the memory to the next. The different components of the image are stored in different sections of the memory so that respective components representing a single portion of the image may be accessed together in one mode while, in another mode, contiguous image data representing a single component may be accessed using all of the multiple channels.

BRIEF DESCRIPTION OF THE DRAWINGS

FIG. 1A (prior art) is a diagram of an image which illustrates image structure for an exemplary decoded MPEG image.

FIG. 1B (prior art) is a diagram which illustrates the structure of an MPEG macroblock.

FIG. 1C (prior art) is a data stream diagram which illustrates a sequence in which decoded image data is provided in by an MPEG decoder.

FIGS. 7A, 7B, 7C and 7D are data structure diagrams which are useful for describing how image data is mapped onto the memory rows of the multi-image memory shown in FIG. 3A.

FIGS. 7E and 7F are data structure diagrams which are useful for describing how image data is mapped onto a memory such as that shown in FIG. 2B.

FIGS. 8 and 9 are data structure diagrams which are useful for describing how image information is stored in the multi-image memory shown in FIG. 3A.

FIGS. 10A and 10B are data structure diagrams which are useful for describing how non-aligned image blocks are accessed in the multi-image memory shown in FIG. 3A.

DETAILED DESCRIPTION OF THE INVENTION

Figure 2A:
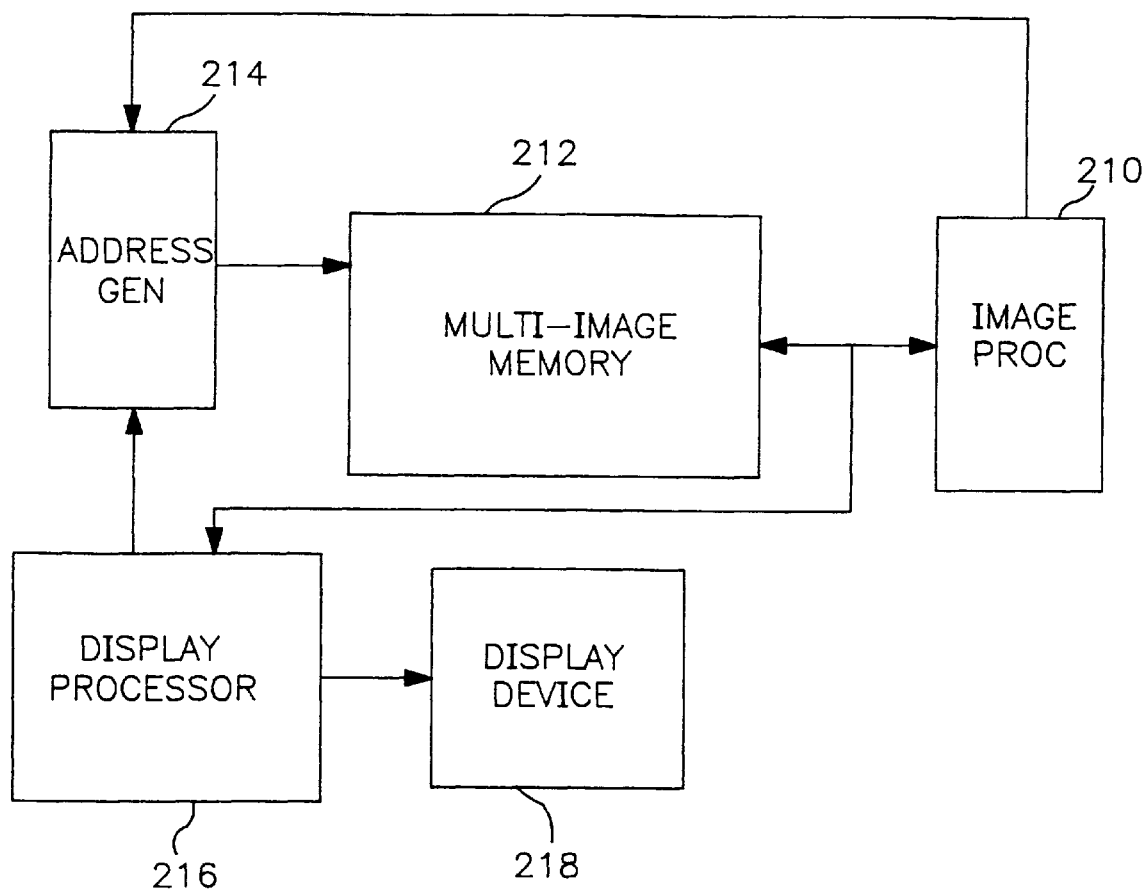
FIG. 2A is a block diagram of an image processing apparatus which includes a multi-image memory according to the present invention.

FIG. 2A is a block diagram of an image processing system which includes a multi-frame memory 212 in accordance with the present invention. The system shown in FIG. 2A includes an image processor 210 which receives data from and provides data to the multi-frame memory 212. The image processor 210 is coupled to an address generator 214 which provides fetch and store addresses for the requested data to the memory 212. The memory 212 is also coupled to a display processor 216 which, through the address generator 214, fetches data from the memory 212 and generates pixel data for display on a display device 218. The display processor 216 causes the address generator 214 to address the multi-frame memory 212 such that pixel data to be displayed is continually provided to the processor 216.

In the exemplary embodiment of the invention shown in FIG. 2A, the multi image memory 212 is arranged in rows and columns of pixel storage areas. These rows and columns do not necessarily correspond to the rows and columns of the stored images. To distinguish between them, the rows and columns of the memory 212 are referred to as "memory rows" and "memory columns" while the rows and columns of an image are referred to as "image rows" and "image columns."

Figure 2B:
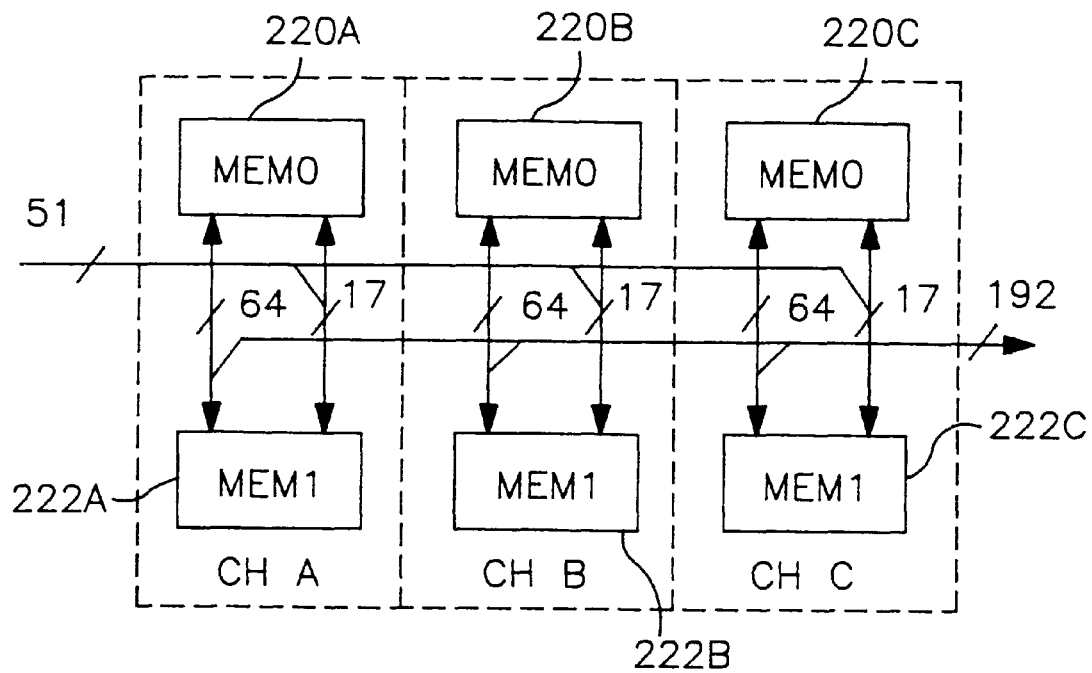
FIG. 2B is a block diagram of the multi-image memory shown in FIG. 2A.

FIG. 2B is a block diagram of an exemplary memory suitable for use as the memory 212 shown in FIG. 2A. In FIG. 2B, the memory 212 is shown as including three channels, each channel including two memory devices. The channels are labeled A, B and C. In channel A, the two memory devices are 220A and 222A. Each pair of memory devices receives a 17 bit address value and provides a 64 bit data value. The memory 212 receives a 51 (17×3) bit address value from the address generator 214 (as shown in FIG. 2A) and provides a 192 (64×3) bit data value to the image processor 210 and display processor 216.

Figure 2C:
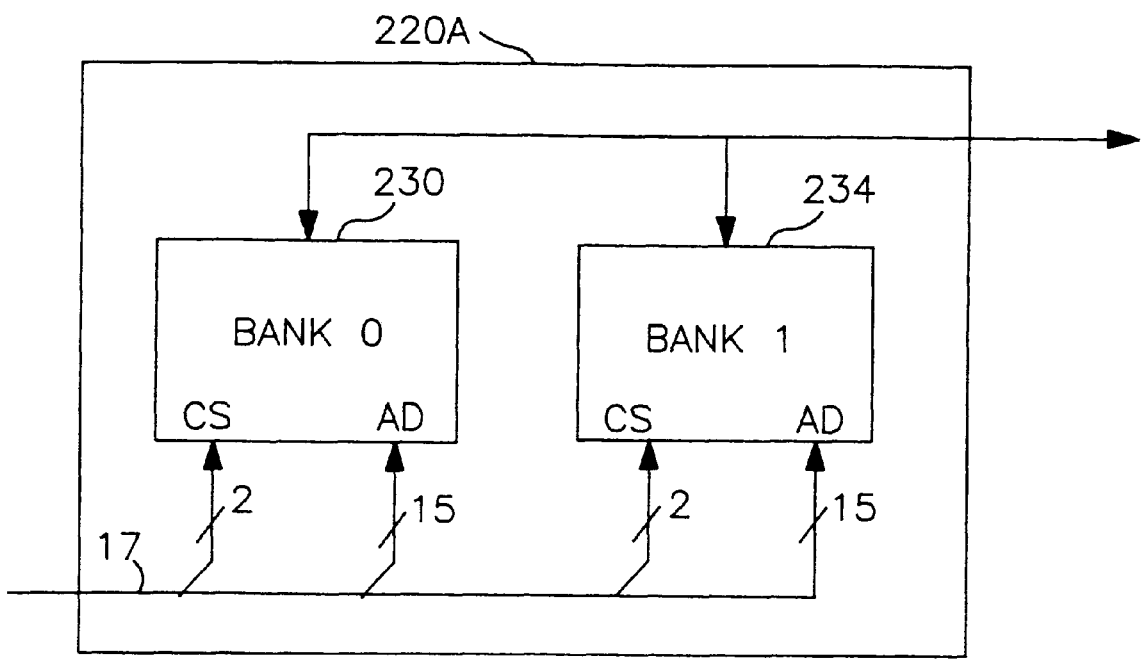
FIG. 2C is a block diagram of one of the memory units of the multi-image memory shown in FIG. 2B.

FIG. 2C shows an exemplary structure for one of the memory devices 220A. As shown in FIG. 2C, the memory device 220A includes two memory banks 230 and 234. The 17 bit address value applied to the memory devices 220A and 222A is divided into a 15 bit address value and a two-bit chip select value. The two-bit chip select value selects one of the four memory banks in the two memory devices 220A and 222A. In the exemplary embodiment of the invention, the two-bit CS signal is used to enable or disable a three-state gate at the output port of each of the two banks of the memory devices 220A, 220B, 220C, 222A, 222B, and 222C. The 15-bit address value is applied to all of the memory devices to select a particular 64 bit word from one of the memory banks. The CS signal allows one 64-bit word from each channel to be applied to the memory bus. The memory structure shown in FIGS. 2B and 2C is advantageous for a video memory because it allows four-way interleaving of the memory. Due to the operation of the CS signal, four 192-bit values may be accessed quickly by simply cycling through the four possible states of the CS signal. If memory operations are conducted in proper sequence, individual operations which store or fetch 192 bytes of data may overlap in time because they are accessing respectively different banks within the memory 212.

Figure 2D:
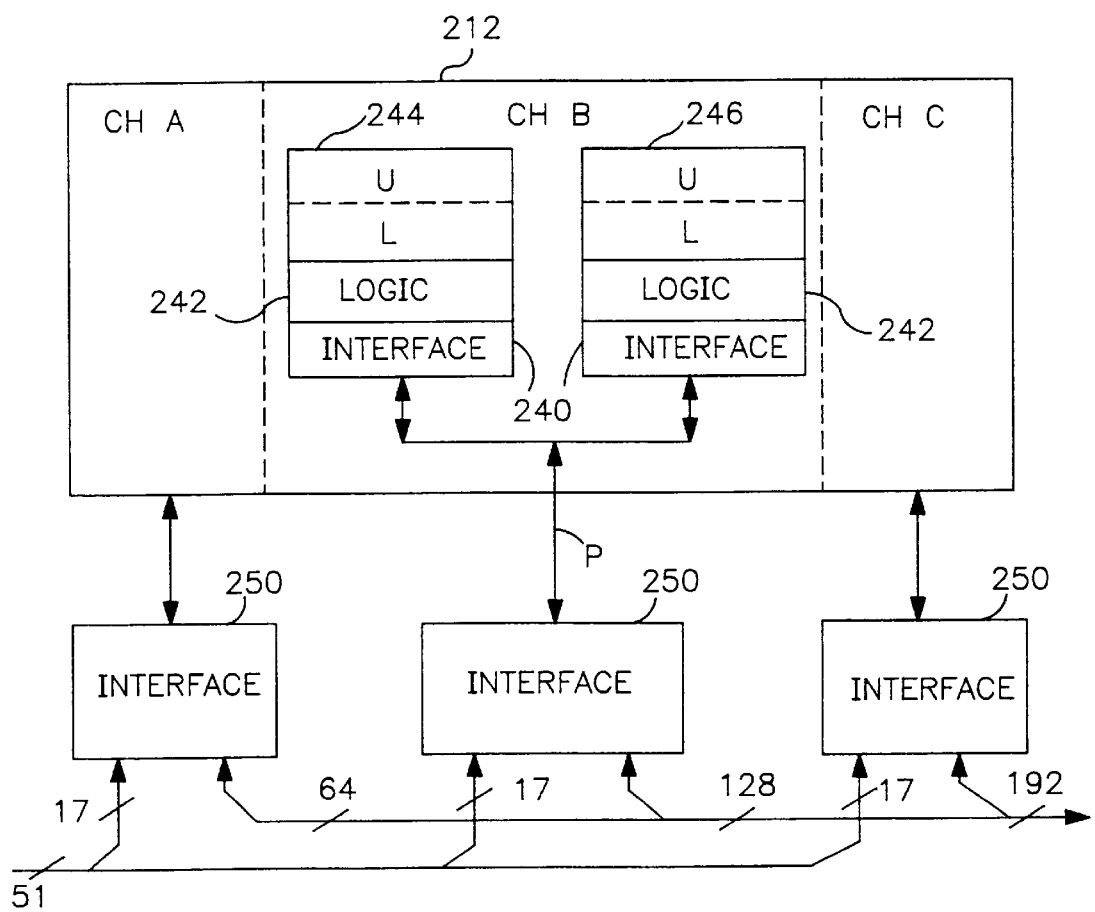
FIG. 2D is a block diagram of an alternative embodiment of the multi-image memory shown in FIG. 2A.

FIG. 2D is a block diagram which shows an alternative memory that may be used as the memory 212. Details of only one of the channels (channel B) are shown in FIG. 2D. The memory is shown as including a single port, P, through which data and address information are transferred between the memory 212, on one hand, and the image processor 210 and display processor 216 on the other hand.

As shown in FIG. 2D, each channel (A, B and C) includes two memory devices, 244 and 246 which hold the actual data. Each memory device, in turn, is divided into two banks, an upper bank (U) and a lower bank (L). The data in each of the channels is arranged in memory rows, each memory row including 2,048 bytes of data. An entire memory row is accessed at once by logic circuitry 242. Since the memory 212 includes three channels, an access to a single memory row returns 6,144 bytes of data.

In the memory system shown in FIG. 2D, the data for a single a memory row is accessed from a single bank of a single device. Thus, each channel contains four rows with the same row number. These rows are differentiated by which bank and which device are used to access the row of data. When a row of data has been addressed and accessed, it is stored in a cache (not shown) internal to the memory interface 240. Subsequent attempts to access data in the same memory row are satisfied from the cache. The logic circuitry 242, responsive to an address value provided by the address generator 214, selects the proper device and bank to be used for a particular memory access and provides data to, or receives data from an interface circuit 250. The interface circuitry receives address values from the address generator 214, provides data values to the display processor 216 and both receives data values from and provides data values to the image processor 210.

The exemplary memory system shown in FIGS. 2B and 2C transfers data at a rate of 24 bytes (192 bits) for each period of the 62.5 MHz system clock signal which is used by the image processor 210 and display processor 214. The rate at which data for an entire image is accessed may be optimized by interleaving the data in the banks of the memories 220 and 222, such that successive groups of eight bytes of data are held in a respectively different one of the four memory banks in the channel. In the memory device shown in FIGS. 2B and 2C, each channel provides "eight bytes" (i.e. one "octbyte") of data for each period of the system clock signal. If both chrominance data and luminance data are being transferred, then two channels provide a total of 16 bytes of luminance data and the remaining channel provides eight bytes of chrominance data (i.e. either the Cb or Cr color difference signal). If only luminance data or only chrominance data is being provided, then all three channels provide either luminance data or chrominance data.

The memory system shown in FIG. 2D differs from that shown in FIGS. 2B and 2C in that it includes the cache which holds an entire memory row of data. Data values are only written into or read from the upper and lower memory banks in units of one row. Data values are provided to and from each cache in groups of eight bytes. By contrast, the memory shown in FIGS. 2B and 2C does not include a buffer but provides data values directly from the memory banks 220 and 222 in units of eight bytes per channel. Because these memories are otherwise equivalent, the description below focuses on the memory system shown in FIG. 2D. Its extension to the memory system shown in FIGS. 2B and 2C is described below.

The exemplary memory shown in FIG. 2D transfers data between the interfaces 250 and the channels A, B and C at a rate of 250 MHz via the bidirectional memory port P, with one byte of data being transferred in each channel coincident with each transition of the 250 MHz clock signal. Thus eight bytes (one octbyte) of data are transferred through each channel in each period of a 62.5 MHz clock signal used by the image processor 210 and display processor 214.

Figure 3A:
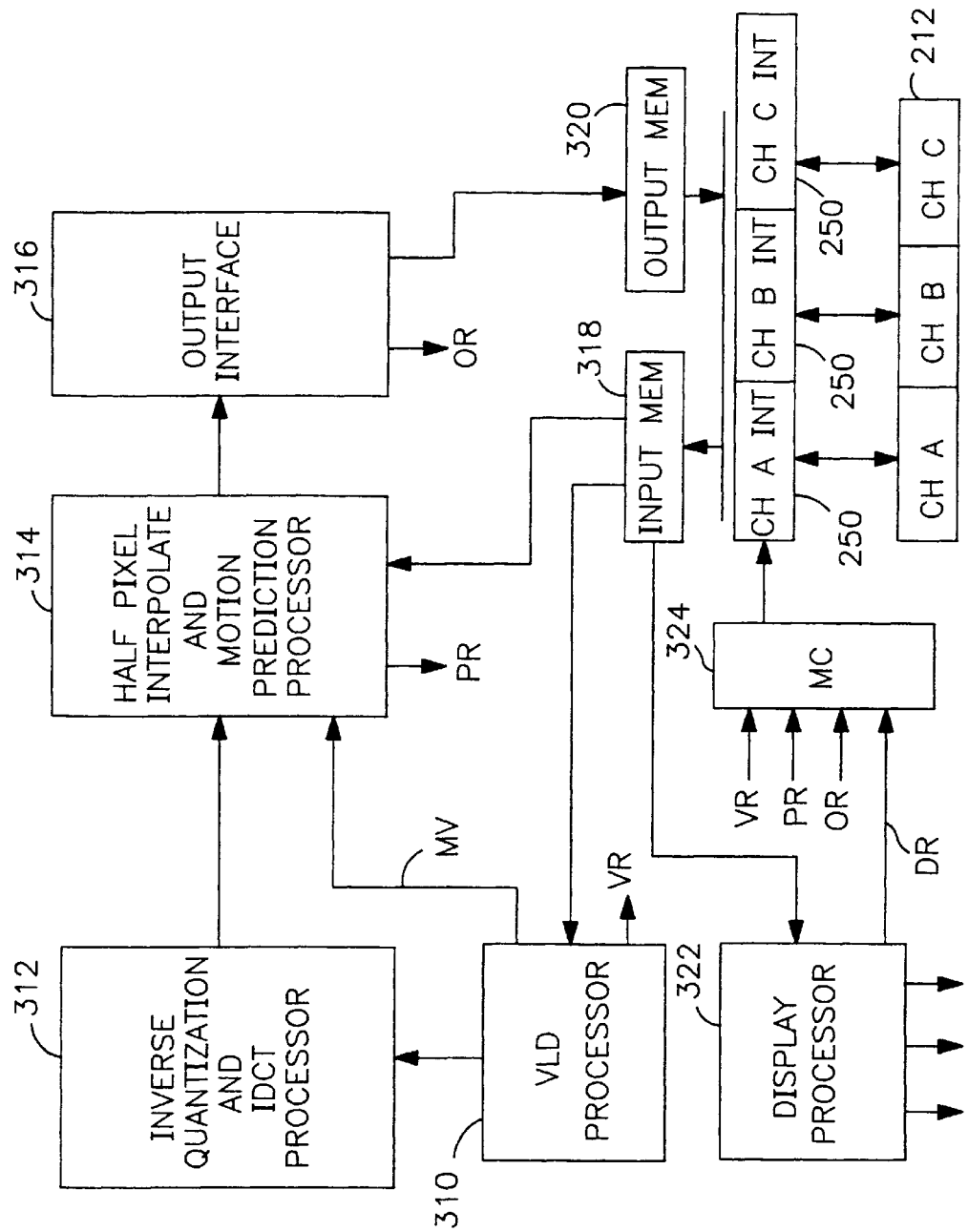
FIG. 3A is a block diagram of an MPEG decoder which includes an embodiment of the present invention.

FIG. 3A is a block diagram which shows the image processing system of FIG. 2A in greater detail including a memory system such as that shown in FIG. 2D. The image processing system shown in FIG. 3A is a decoder which decompresses image information that has been encoded according to the MPEG-2 standard. In addition to the memory 212, the processing system shown in FIG. 3A includes a variable length decoding (VLD) processor 310, an inverse quantization and inverse discrete cosine transform (IDCT) processor 312, a half-pixel interpolation and motion prediction processor 314, an output interface 316 and a display processor 322. The memory system 212 interfaces with the image processor through an input memory 318 and an output memory 320. In addition, the image processing system shown in FIG. 3A includes a memory controller 324 (described below with reference to FIGS. 3B and 3C) which operates through the memory interfaces 250 to perform many of the same functions as the address generator 214, shown in FIG. 2.

In the system shown in FIG. 3A, encoded image data is provided to the VLD processor 310 and decoded image data is applied to the half pixel interpolation and motion prediction processor 314 and the display processor 322 from the memory 212 via the input memory 318. Decoded image data is provided to the memory 212 by the output interface 316 via the output memory 320. In the exemplary embodiment of the invention, the input memory 318 receives 192 bits of data from the channel interfaces 250 and then provides this data to one of the processors 310, 314 and 322 in smaller groups of bits (e.g. 24-bit data words). In the same way, the output memory 320 collects data from the output interface 316 in relatively small increments (e.g. 24 bits) and provides 192 bits of data to the channel interfaces 250. If the memory shown in FIGS. 2B and 2C were used in the system shown in FIG. 3A, the input memory 318 and output memory 320 would respectively receive and provide 192 bits of data from the memory 212 and the address generator 214, shown in FIG. 2A would replace the memory controller 324.

The system shown in FIG. 3A receives a serial bit-stream representing MPEG-2 encoded video data, for example, from a transport decoder (not shown) which is connected to the interface processors 250 via a separate path (not shown). The bit-stream data is provided 192 bits at a time to the VLD processor 310. The processor 310 partially decodes the variable-length data stream to produce fixed-length code words which represent discrete cosine transform (DCT) coefficients and various control values that determine how the coefficients are decoded. One type of control value is a macroblock motion vector; this type of data is provided by the processor 310 to the interpolation and motion prediction processor 314 via the bus MV.

The processor 312 converts the DCT coefficients into pixel values and passes eight-pixel by eight-pixel blocks of data values to the processor 314. If the blocks have been encoded using motion compensation techniques, these data values are residual values which are to be added to values of a reference block from a previously decoded frame in order to produce the final pixel values. This summation is performed in the half pixel interpolate and motion prediction processor 314. The processor 314 fetches a reference block from the memory 212 and combines it with the residual pixel values provided by the Inverse Quantization and IDCT processor 312.

Figure 1D:
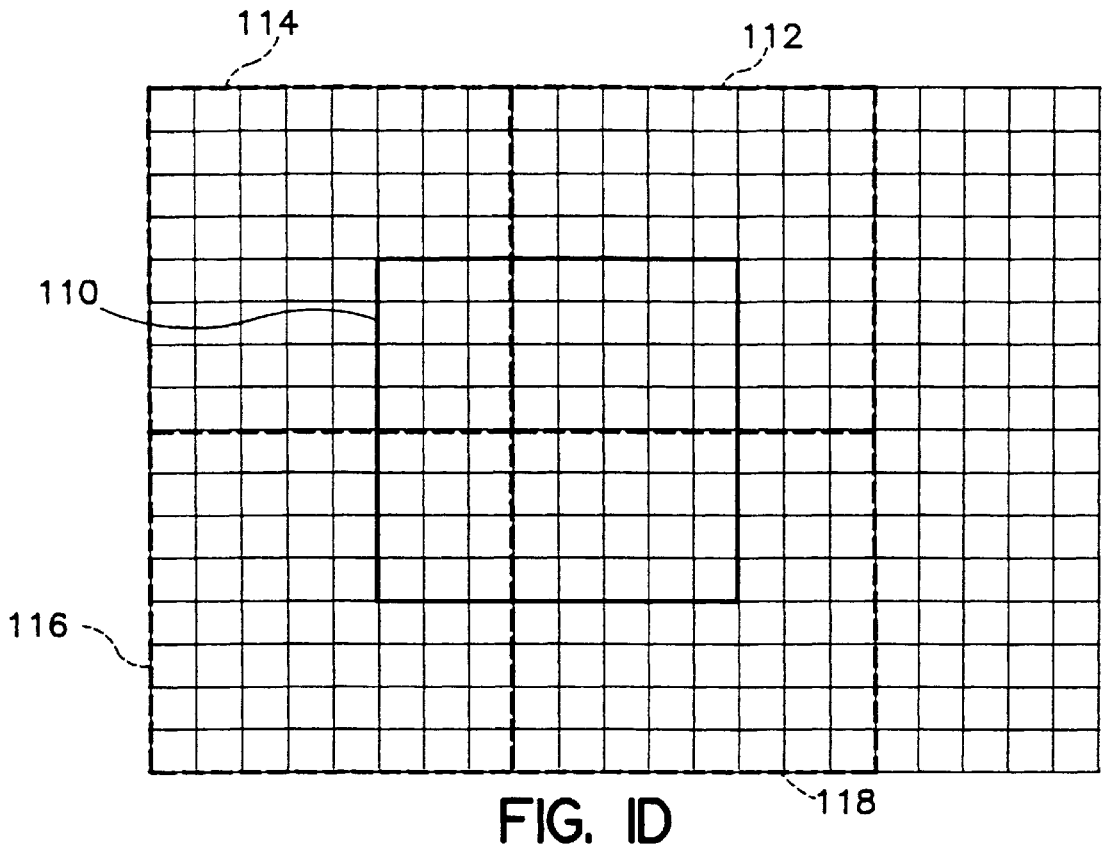
FIG. 1D is an image diagram which shows a non-aligned block of pixels defined from among aligned blocks of pixels.
Figure 1E:
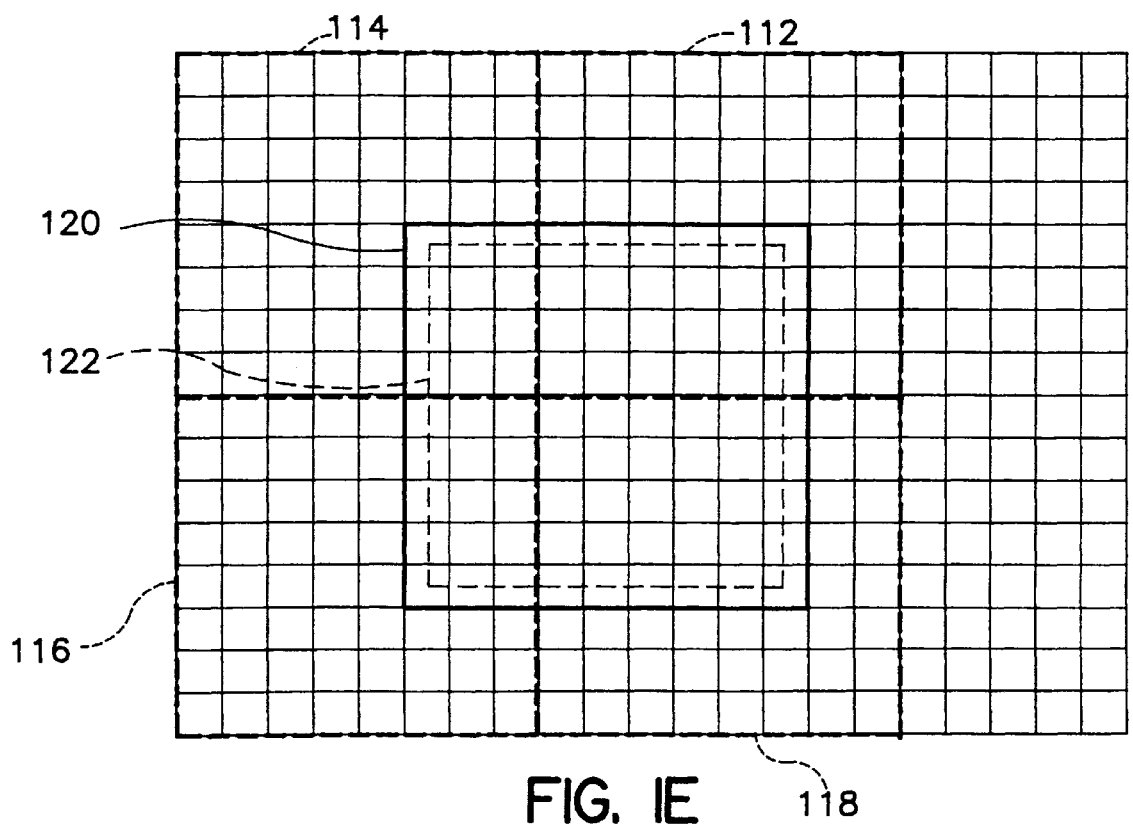
FIG. 1E is an image diagram which shows an interpolated block of pixels defined from among aligned blocks of pixels.

To obtain a reference block, the processor 314 may need to interpolate between reference blocks in two different frames, a forward frame and a backward frame. In order to obtain a reference block, such as the reference block 122 shown in FIG. 1e which is displaced by one-half pixel position both horizontally and vertically with respect to the reference block 110 shown in FIG. 1d, the processor 314 may need to interpolate between adjacent pixels in a single frame. To perform both of these interpolation operations, the processor 314 fetches four blocks of data, one from each field in the forward and backward frames stored in the memory 212 and each fetched block is larger by one pixel position in each direction than a conventional field block of pixels.

When each block of pixels has been processed by the half pixel interpolate and motion prediction processor 314, it is passed to the output interface 316 which collects blocks of pixels for storage into the memory 212 via the output memory 320. The output interface 316 buffers blocks of pixel values so that they may be transferred to the output memory 320. As described above, the data path between the output interface 316 and the output memory 320 may be implemented as a 24-bit bus while the data path between the output memory 320 and the interface circuits 250 is a 192-bit bus. As described below, blocks of chrominance data are written into the memory 212 at different locations than the corresponding blocks of luminance data. Accordingly, the output interface 316, in addition to providing an address for writing the data into the memory, provides an indication of which of the blocks being transferred are luminance data and which are chrominance data.

When decoded pixel data stored in the memory 212 is to be displayed, it is accessed by the display processor 322 via the input memory 318 and the memory interface ASICs 250. While data may be accessed one block at a time for display, typically only one line of pixels from the block is used during any one access. In addition, in order to properly reconstruct color pixel values, both the luminance data and the chrominance data for the lines of pixels are accessed together.

Figure 3B:
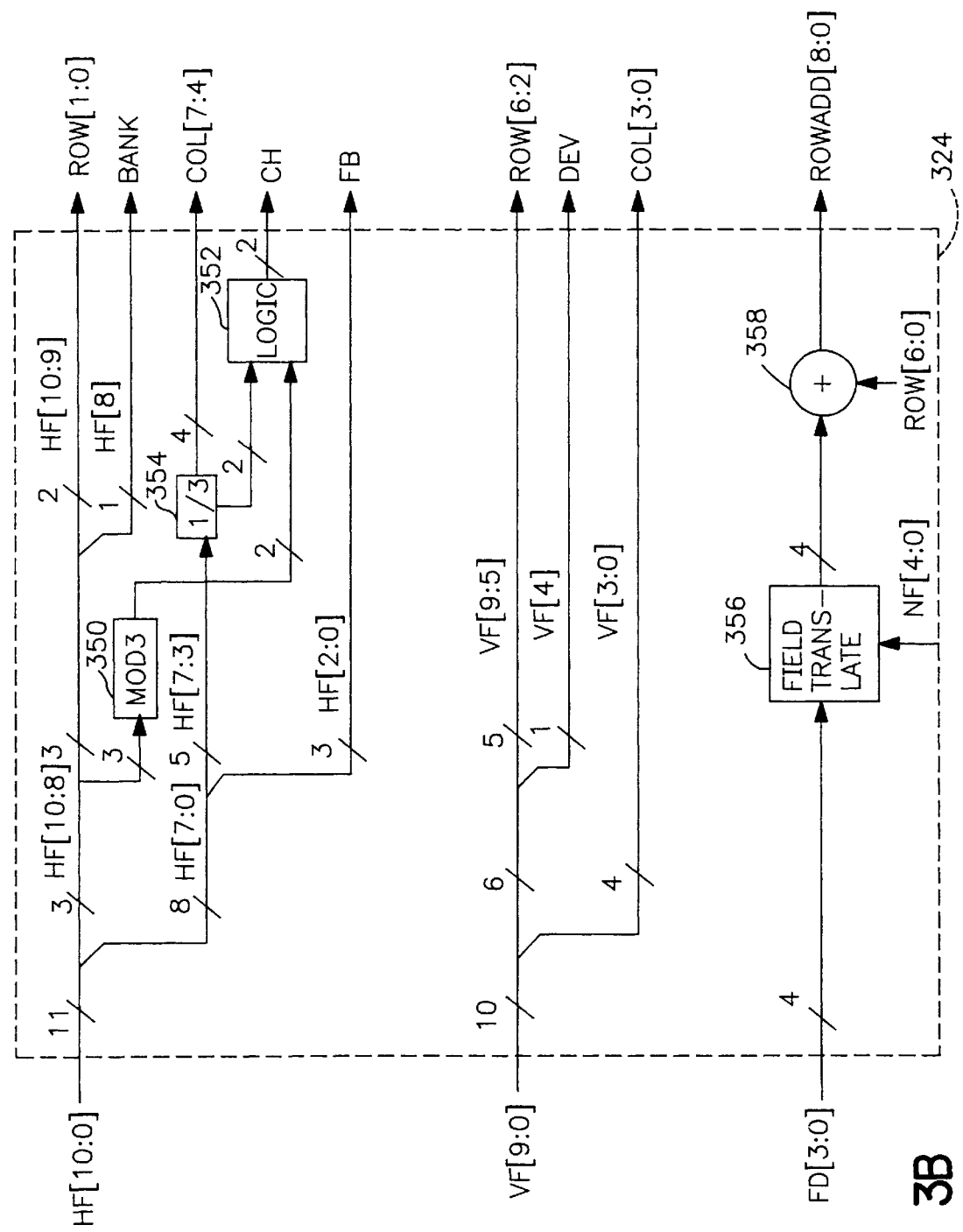
FIGS. 3B and 3C are a block diagrams which show details of the memory controller shown in FIG. 3A.
Figure 3C:
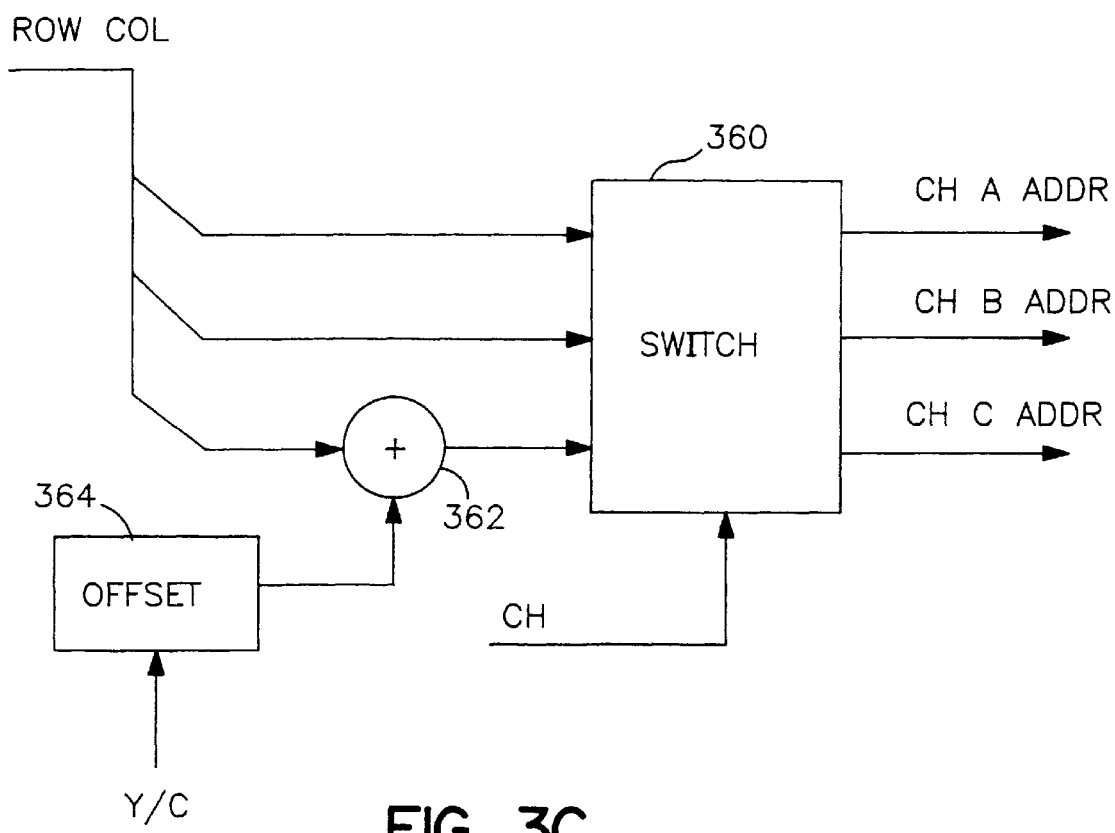

Each of the processors 310, 314, 316 and 322, produces a respective control signal, VR, PR, OR and DR, which is applied to the memory control circuit 324 to control the storing and fetching of data from the memory 212. FIGS. 3B and 3C are a block diagram of circuitry suitable for use in the memory control circuit 324. This exemplary circuitry is used to address blocks of pixel values of an image stored in the memory 212.

In FIG. 3B, the control signal applied to the memory control circuit 324 is divided into three parts, a horizontal portion HF, a vertical portion VF and a field portion FD. Bits 10 and 9 of the 11-bit HF signal become the two least significant bits (LSBs) of the memory row address signal ROW. Bit 8 of the signal HF becomes the signal BANK which indicates which bank, U or L of the memory device (e.g. 244 or 246 shown in FIG. 2C) the addressed data will be found. Bits 10, 9 and 8 of the signal HF are also applied to a modulo 3 divider 350 which produces a two-bit output value representing the three-bit value HF [10:8] modulo 3. This value is applied to one input port of a logic circuit 352 which is used to assign addresses to channels, as described below with reference to FIGS. 3C and 7A through 7F. The three LSBs of the signal HF, HF[2:0] are provided by the memory controller shown in FIG. 3B as the signal FB. This value specifies which byte within the returned octbyte corresponds to the addressed pixel.

The bits HF[7:3] are applied to a divide-by-three circuit 354. This circuit produces two values, a four-bit value which represents the integer part of the value HF[7:3]/3 and a two-bit value which represents HF[7:3] modulo 3. The four-bit value is the four most significant bits of the memory column address while the two-bit modulo value is applied to a second input port of the logic circuit 352. The output signal of the logic circuit 352 is a two-bit signal CH. This signal is used, as described below with reference to FIG. 3C to apply appropriate address values to the respective channels A, B and C.

The ten-bit vertical portion, VF[9:0], of the 21-bit address value is split-up by the memory control circuit 324 into three fields. The five most significant bits (MSBs) of this ten-bit value become the five MSBs of the memory row address (ROW[6:2]). Bit 4 of the ten-bit value is the device address signal, DEV. This signal is used to select one of the devices (e.g. 244 or 246) of the memory 212. The four LSBs of the ten-bit vertical portion ([3:0]) become the four LSBs of the memory column address (COL[3:0]).

The four-bit field portion of the address value, FD[3:0] is converted into a memory row base address by a field translate table 356 to produce a base address in the memory 212 for the field in which the addressed data occurs. The field translate table maintains a mapping between field numbers used by the various processors of the image processing circuitry 210 and the display processor 216 (both shown in FIG. 2A) on one hand, and the physical addresses in the memory 212 corresponding to the fields on the other hand. The translate table is programmed by a five-bit signal, NF[4:0], which may, for example, be generated by a controller (not shown) that maintains the memory map as described below with reference to FIG. 4B. The output signal provided by the translate table 356 is a nine-bit value that points to a memory row which is the base address for the stored image field. The memory row address for the data to be accessed is obtained by summing this 9-bit value with the seven-bit row address value ROW[6:0] in an adder 358.

As described below with reference to FIGS. 7A through 7F, luminance data and chrominance data are stored in respectively different sections of a memory row so that luminance and chrominance data may be accessed either separately or together using all three channels. FIG. 3C is a block diagram of circuitry which allows this type of access to occur. In FIG. 3C, the composite memory row and memory column address is applied to two input ports of a switch 360. It is also applied to one input port of an adder 362. The other input port of the adder is coupled to receive an offset value provided by a digital data source 364. The source 364 may be, for example, a hard-wired register (not shown) which is enabled by a signal Y/C. If the signal Y/C indicates that only luminance data or only chrominance data is being provided, a value of zero is applied as the offset value. If, however, the signal indicates that a combination of luminance and chrominance data is being provided, then a memory column address offset of, for example, 160 is added. This offset is appropriate if the memory described above with reference to FIG. 2C is being used. If a memory system such as that shown in FIGS. 2A and 2B is being used, a different offset value may be appropriate. This address value may be determined as described below with reference to FIGS. 7E and 7F.

The output signal of the adder 362 is applied to a third input port of the switch 360. This switch is responsive to the signal CH to apply the output signal provided by adder 362 to one of the channels while providing the combined memory row and memory column address value to the other two channels. The method by which address values are applied to the three memory channels is described below with reference to FIGS. 7A through 7F.

Figures 4A, 4B:
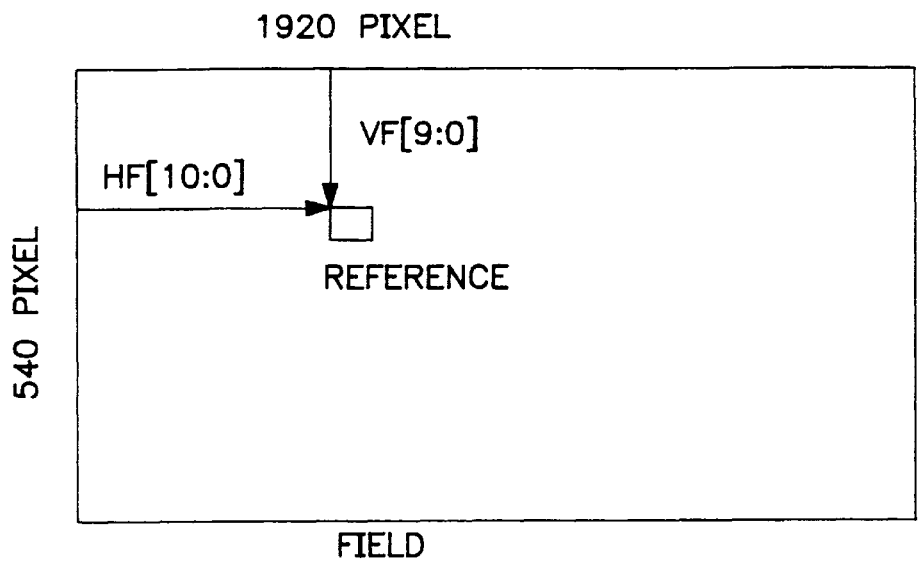
FIG. 4A is an image diagram which illustrates the image addressing scheme implemented by the memory controller shown in FIGS. 3B and 3C.
FIG. 4B is a memory map diagram which shows an exemplary layout of three images in the multi-image memory shown in FIG. 3A.

FIG. 4A is an image field address diagram which illustrates how a reference block is located using the ten-bit vertical address portion, VF[9:0], and the eleven-bit horizontal address portion, HF[10:0]. As shown in FIG. 4A, using these two values, the first pixel of a reference block located anywhere in the field can be addressed. The pixel address values HF and VF are translated by the circuitry shown in FIGS. 3B and 3C to obtain the pixel from the appropriate memory row, memory column and octbyte in the multi-frame memory 212.

FIG. 4B is a diagram of the memory 212 which illustrates the layout of the image fields and the encoded data buffer (VBV buffer). As shown in FIG. 4B, at any given time, the memory 212 holds six fields, A0, A1, B0, B1, C0 and C1. These fields are paired into frames. The three frames represent a forward reference frame, a backward reference frame and a display frame. There is no fixed assignment among the frames. A frame which is being used as the forward reference frame may become the display frame while the previous display frame becomes the backward reference frame and a new frame, which was just stored into the memory area corresponding to the previous backward reference frame, becomes the forward reference frame. The translation from a backward frame, forward frame or display frame indicator provided by the processors 314 and 322 into one of the six fields shown in FIG. 4B is handled by the field translate table 356. This table is loaded by a microprocessor (not shown) with memory row values that correspond to the bases of the six fields in the multi-frame memory as shown in FIG. 4B. As the function of each field changes, the table 356 is updated so that the field part FD [0:3] of the pixel address value is translated into the proper base address.

Figure 5A:
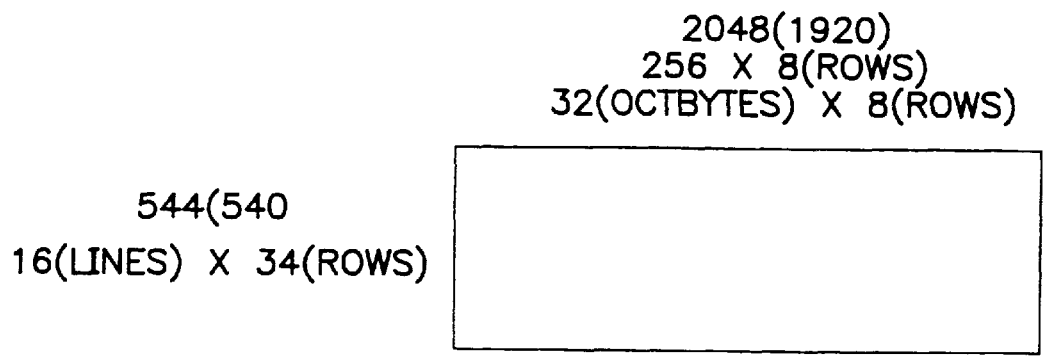
FIGS. 5A, 5B and 5C are data structure diagrams which are useful for describing the layout of the images in the multi-image memory shown in FIG. 3A.
Figure 5B:
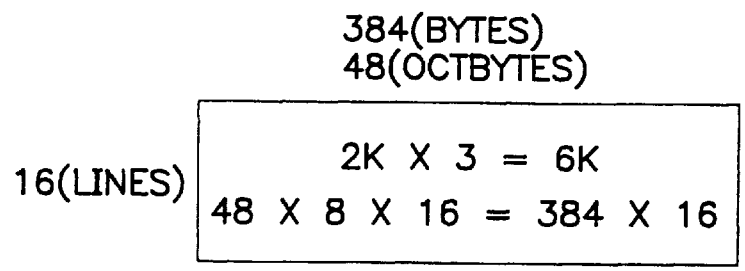
Figure 5C:
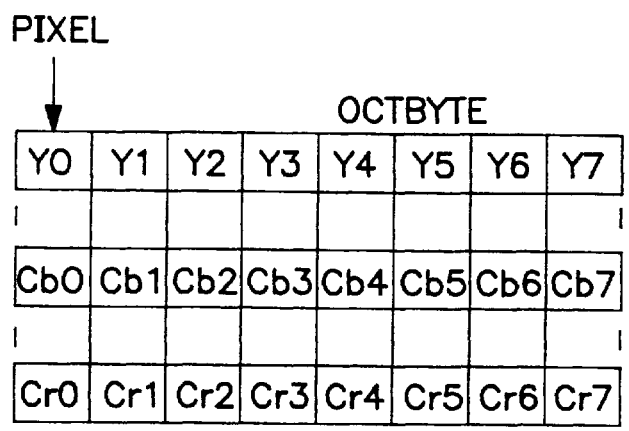

FIGS. 5A, 5B and 5C are data structure diagrams which are useful for describing how a field of image data is stored in the memory 212 when a memory system such as that shown in FIG. 2D is used. FIG. 5A shows an image field for a main profile high level image. This image field includes 540 lines, each line having 1920 pixels. As described above, the memory rows of data provided by the memory 212 are fixed in length. Accordingly, a slice of macroblocks, that spans the width of the image, uses eight memory rows, each memory row, as shown in FIG. 5B, includes 6,144 bytes of data, arranged in a matrix of 384 bytes horizontally by 16 lines vertically. As described above, the memory 212 provides data in units of eight bytes (one octbyte). FIG. 5C is a data diagram which shows three octbytes of data, one for the luminance signal (Y) and one for each of two color difference signals (Cb and Cr).

Figure 6:
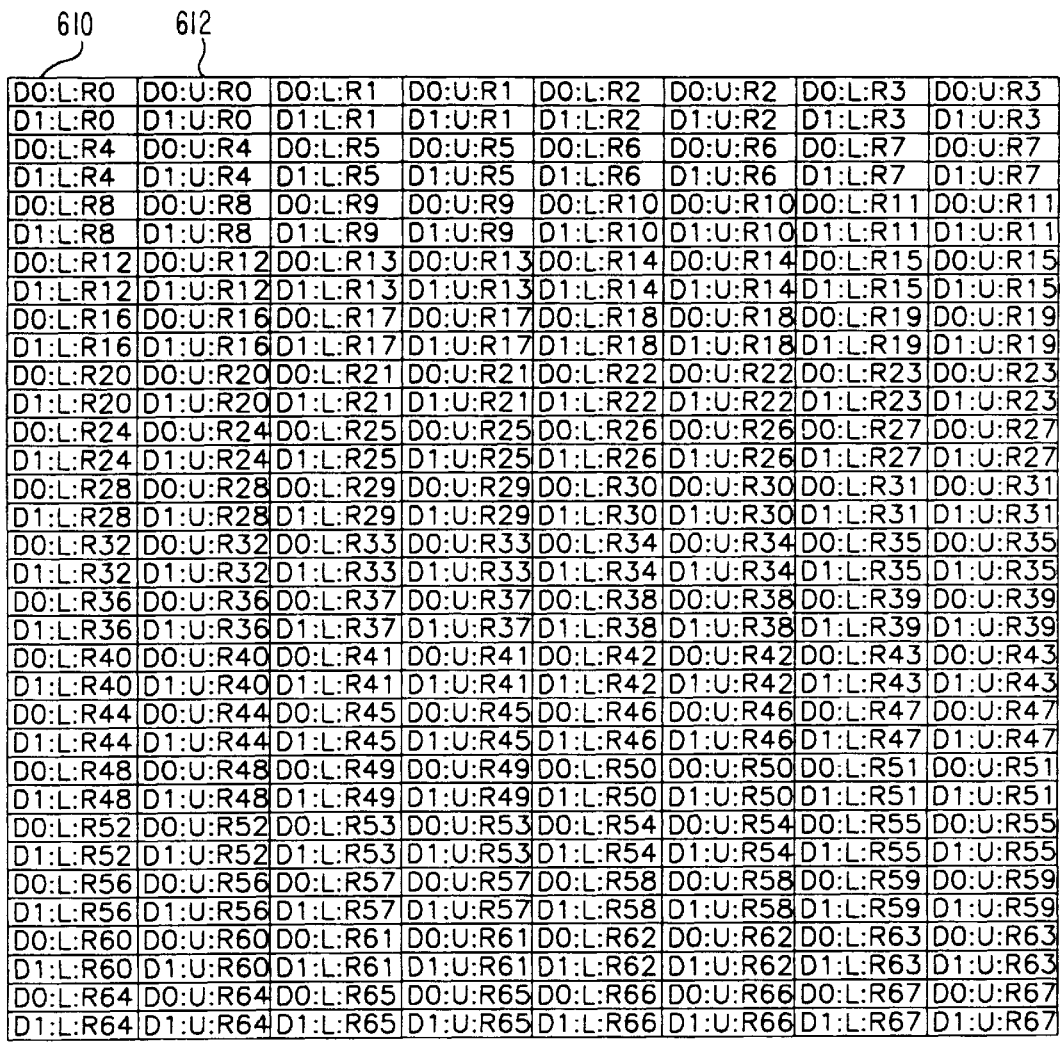
FIG. 6 is a data structure diagram which illustrates how one of the field images shown in FIG. 4B is stored into the multi-image memory shown in FIG. 3A.

FIG. 6 is a memory map diagram which shows how the memory rows that constitute field A0 shown in FIG. 4B are stored in the memory 212. As shown in FIG. 6, the memory rows of macroblocks are identified by their device number (D0 or D1) their bank within the device (L or U) and their memory row number within the bank (R0 through R67). The next image field (i.e. field A1) would begin at memory row R68.

It is noted that the device assignment for the memory rows alternates down the columns of the stored image. The successive memory rows in the first column of the data structure follow the sequence D0, D1, D0, etc. When a RAMBUS memory system such as that shown in FIG. 2D is used, this vertical interleaving of the memory rows in the different devices allows pairs of vertically aligned rows to be accessed at greater speed than if the rows were stored in the same device. This feature of the RAMBUS system is described in greater detail below with reference to FIGS. 10A and 10B. If a memory system such as that shown in FIGS. 2A and 2B is used, it may be advantageous to interleave the data in a finer granularity, for example, storing alternate macroblock rows (each row containing 24 bytes—or 192 bits—of data) in alternate memory banks of the three channels and to store corresponding vertically aligned rows in alternate devices of the respective banks. Exemplary schemes that may be used with a memory system such as that shown in FIGS. 2A and 2B are described below with reference to FIGS. 7E and 7F.

Figures 7A, 7B, 7C:
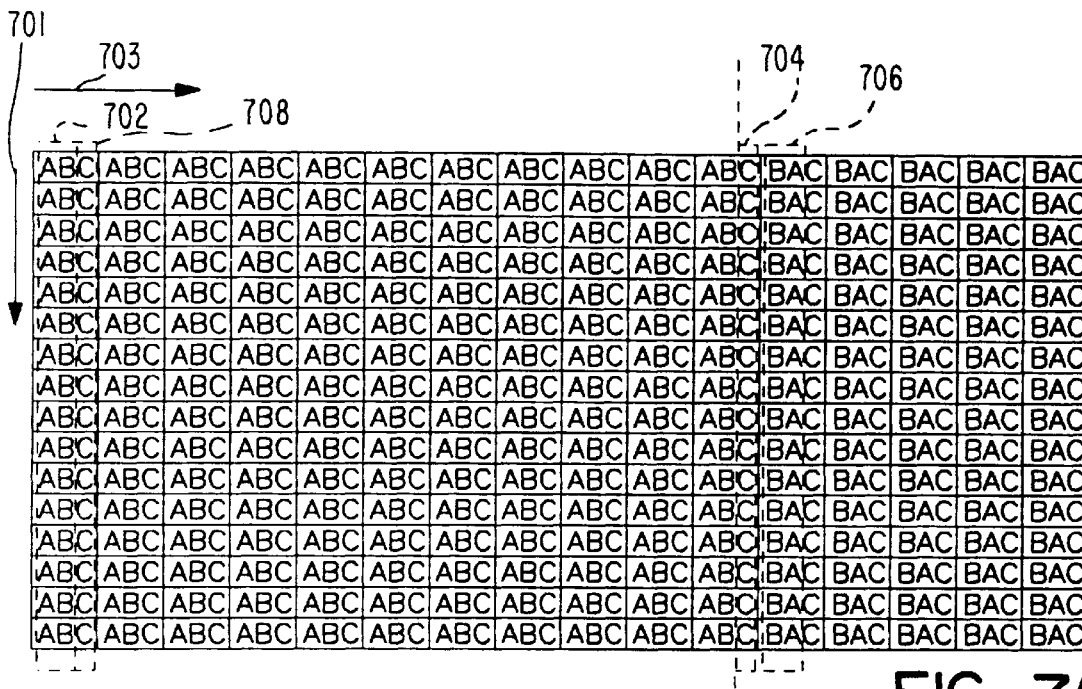

As defined in the MPEG-2 specification, each macroblock includes six blocks, four 8-pixel by 8-line blocks of the luminance information signal, Y, and one 8-pixel by 8-line block of each of the two chrominance information signals, Cb and Cr. FIGS. 7A, 7B and 7C show a mapping of image pixels into the memory shown in FIG. 2D which is advantageous for use in the present invention. FIG. 7A shows a first memory row of pixel data, row 1, for an image field as it is stored in the memory 212. FIGS. 7B and 7C each show one-half of memory rows 2 and 3 which contain pixel information that follows row 1 horizontally as shown in FIG. 6.

The rows of memory shown in FIGS. 7A, 7B and 7C are divided into two sections. The sections to the left of the dashed vertical line 700 hold the luminance data and the sections to the right of the line 700 hold the chrominance information. Each of the letters, A, B and C represents an octbyte of data obtained from a respective one of the three channels of the memory 212. Thus, the memory row shown in FIG. 7A includes 16 lines, each containing 48 octbytes. In the exemplary embodiment of the invention, all three of the channels are used during each memory access operation. Referring to FIG. 3A, when a macroblock of data is being stored into the memory 212 from the output memory 320, two channels are used for luminance information (two octbytes per 62.5 MHz clock pulse) and one channel is used for chrominance information (one octbyte per 62.5 MHz clock, alternating Cb and Cr). When data is being fetched for use by the half-pixel interpolate and motion prediction processor 314, and when data is being retrieved by the display processor 322, all three channels are used first to fetch luminance information and then to fetch chrominance information.

Data is both written into and read from the memory 212 for use by the half-pixel interpolator such that successive octbytes are accessed in the direction indicated by the arrow 701. Data is read from the memory for display, however, such that successive octbytes are obtained in the direction indicated by the arrow 703.

Figures 8, 9:
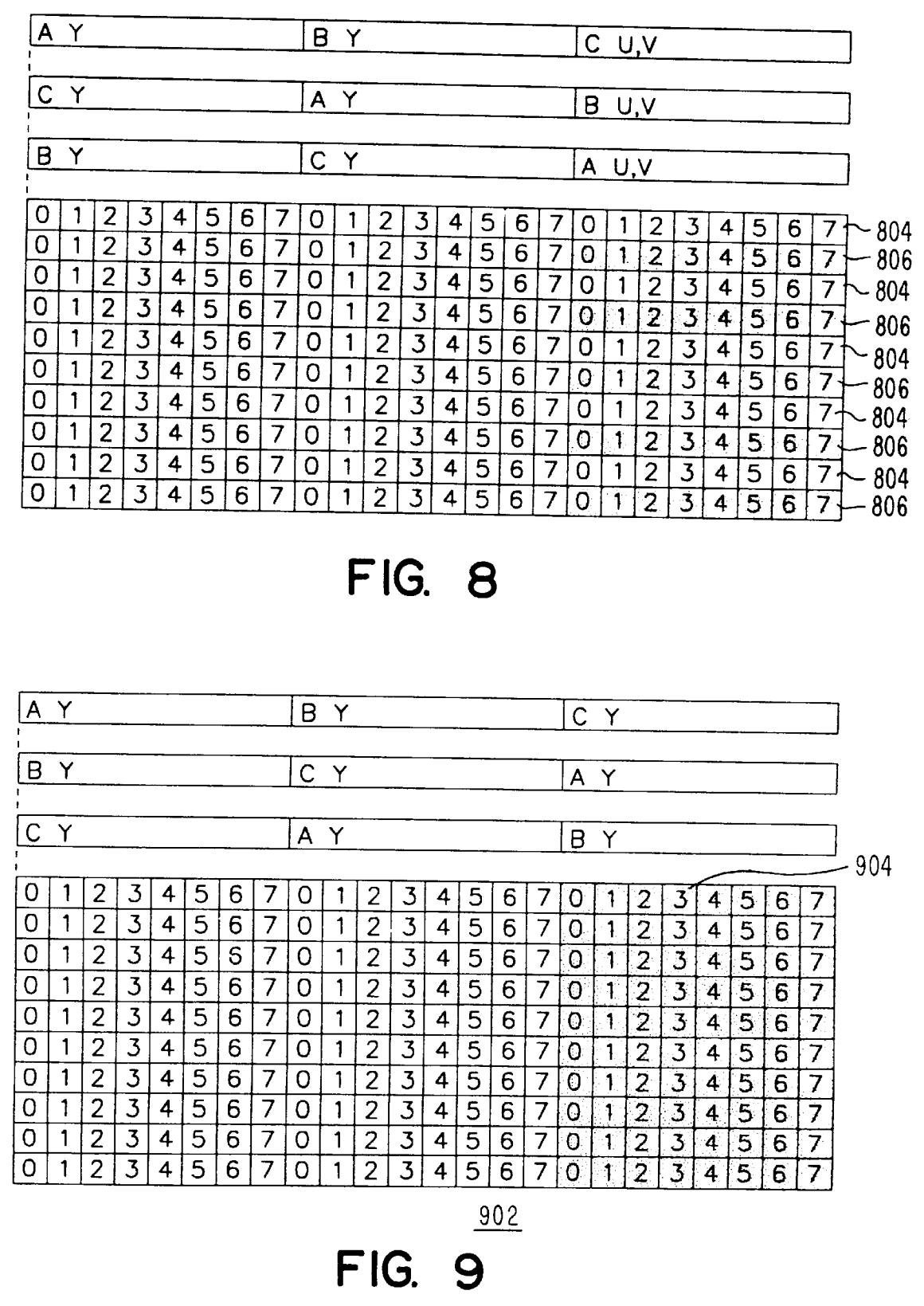

It is noted that the luminance information (designated as Y) and chrominance information (designated as CbCr) are written concurrently into the channels A, B and C of the memory 212 in the order Y-(A,B), CbCr-(C); Y-(C,A), CbCr-(B); Y-(B,C), CbCr-(A). as illustrated in FIG. 8. As shown in FIG. 7A, the Y data is written to the left of dashed line 700 while the corresponding CbCr data is written to the right of dashed line 700 (i.e. with a memory column address offset of 160). As shown in FIG. 8, the Cb chrominance information 804 is vertically interleaved with the Cr chrominance information 806. The luminance component of each successive horizontal macroblock occupies two complete memory columns of a first memory row, shown in FIG. 7A, while the chrominance information occupies one complete column. The luminance components are written starting from the left edge of FIG. 7A and the chrominance components, starting from the dashed line 700. This pattern continues until luminance information is written, on channels A and B, into the last cell of the column which begins with address 160 and the corresponding chrominance information is written into the last cell of the right-most column of FIG. 7A. The next macroblock is written in a second memory row of the memory 212 which is shown in FIG. 7B.

The data in this second memory row continues the ordering described above such that the last luminance data in the first memory row—written into the memory using channels (A,B)—is followed by luminance data written into the memory 212 using channels (C,A) in the second memory row. The data is written in this pattern so that luminance and chrominance data is continuous in consecutive use of the memory channels A, B and C across memory row boundaries.

FIG. 7D is a memory map diagram which relates the memory column addresses to the memory row layout shown in FIG. 7A. As shown in FIG. 7D, each memory row includes 256 memory columns, each memory column containing three octbytes of data, one for each channel, A, B and C of the memory 212. Referring to FIG. 3C, when two octbytes of luminance data and one octbyte of chrominance data are stored into the memory at address zero, the two luminance octbytes are written into memory column 0 while the chrominance octbyte, due to the addition of the offset value 160, is written into memory column 160 of channel C. Referring to FIG. 7A, memory column 160 is immediately to the right of line 700. The switch 360 shown in FIG. 3C and the logic 352 shown in FIG. 3B permute the column addresses as shown in FIGS. 7A, 7B and 7C so that the displaced address is always applied to the proper channel to store or fetch the appropriate chrominance octbyte.

Figures 7E, 7F:
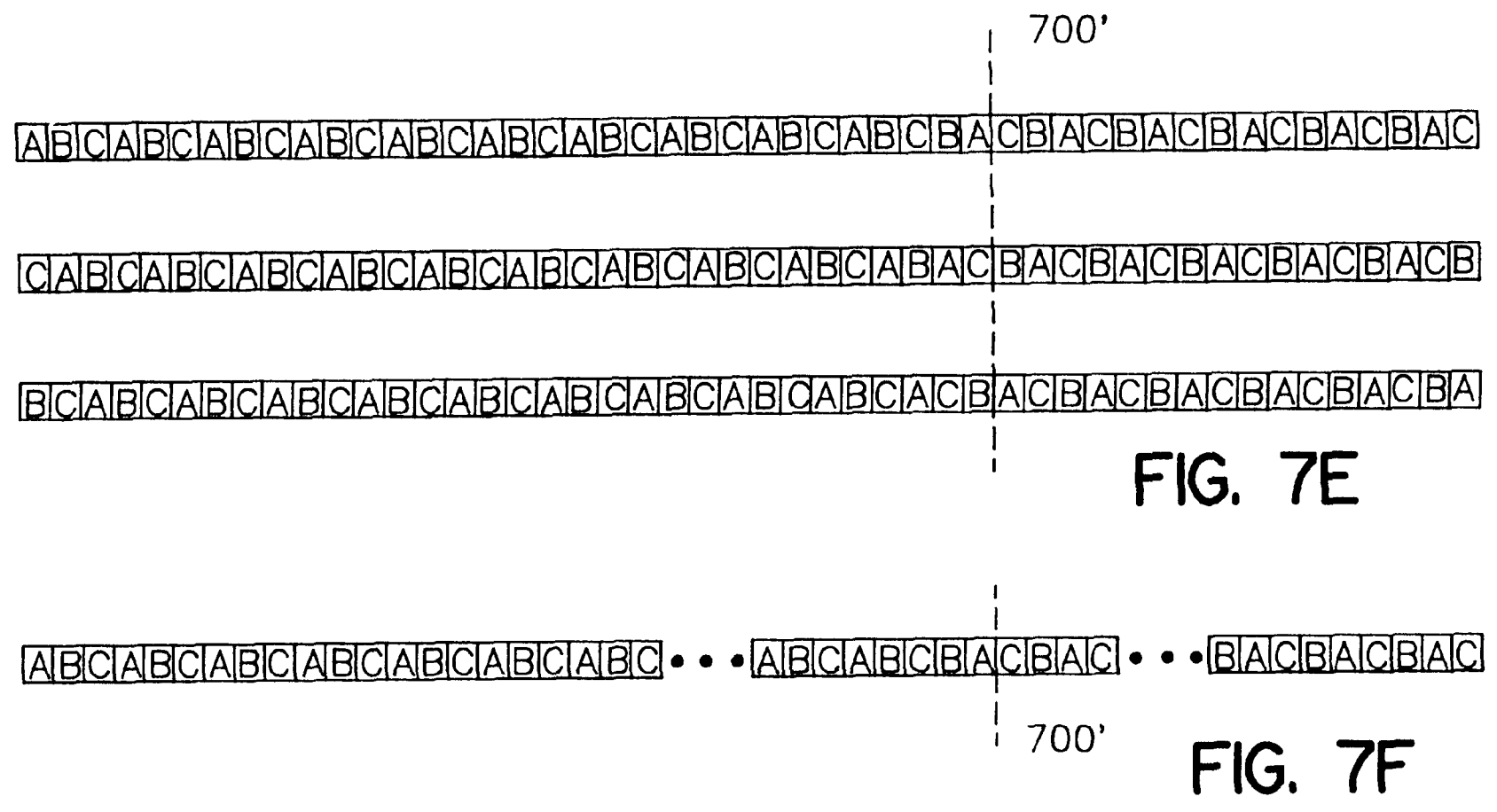

FIGS. 7E and 7F show two memory mappings appropriate for use with a memory system such as that shown in FIGS. 2B and 2C. In the mapping shown in FIG. 7E, the memory row corresponds to an MPEG-2 image slice—a set of macroblocks which spans the image horizontally. Using this mapping, an address offset of 3840 would be used to separate the chrominance blocks (to the right of line 700') from the luminance blocks. The above assumes that individual pixels are addressed, eight pixels are stored in each channel address, that a slice includes 60 macroblocks (1920 pixels per image line.

The sequencing of the channels used in the mapping scheme shown in FIG. 7E follows the same convention as the mapping shown in FIGS. 7A, 7B and 7C. This sequencing allows all three channels to be accessed horizontally and vertically to obtain contiguous image data. It also allows luminance data and corresponding chrominance data to be accessed using the three channels while still allowing all three channels to be accessed to obtain contiguous luminance data or contiguous chrominance data.

In the mapping scheme shown in FIG. 7F, the memory row corresponds to an entire field and the offset value used to separate the chrominance data from the luminance data is 1036800. The channel sequencing used in this embodiment of the invention only ensures that consecutive strings of pixels can be written into memory or fetched from memory using all three channels. The channel sequencing does allow horizontally contiguous luminance pixel components, horizontally contiguous chrominance pixel components or corresponding contiguous luminance and chrominance pixel components, to be accessed concurrently each using all three channels. This memory mapping scheme is not as flexible as the ones shown in FIGS. 7A, 7B, 7C and 7E because it does not allow vertically contiguous pixels to be accessed using all three channels.

FIG. 6 shows one complete field where each cell is a memory row such as shown in FIG. 7A (i.e. using a memory system such as that shown in FIG. 2D. A horizontal macroblock row (16 lines of a video image) uses eight memory rows as shown in FIG. 6. The data ordering method described above provides data continuity across the memory rows shown in FIG. 6. The primary importance of this ordering is to allow reference macroblocks to be easily accessed. As defined in the standard, these reference macroblocks are offset from the current input macroblock by respective motion vectors which define arbitrary vertical and horizontal displacements, each with one-half pixel resolution. The implication of this is that the position of a reference macroblock is not confined to the cell lines of FIGS. 6 or 7A through 7C. This offset addressing was described above with reference to FIGS. 1d and 1e.

The particular arrangement of data shown in FIGS. 7A, 7B and 7C and the memory system shown in FIG. 2D allows the storage of a newly decoded luminance-chrominance macroblock using only a single memory access request and it also allows arbitrarily positioned blocks of luminance pixels in 17 by 9 format and chrominance pixels in 9 by 5 format, as described below, to be accessed for motion compensation processing using at most two memory accesses. Furthermore, these two requests may be pipelined.

When memory 212 is read for display, a field is generally read from left to right and top to bottom. As described above with reference to FIGS. 7A through 7F, all three memory channels are used. In the discussion that follows, FIG. 10A represents the memory row 610 in the upper left-hand corner of FIG. 6 and FIG. 10B represents the memory row 612 positioned to the right of row 610. In one access, the first line of FIG. 7A is read from left to right in the direction of arrow 703. Note that all of the Y values are read first, followed by the Cb and Cr values. The next access is made from the second memory row 612, as shown in FIG. 7B. Within FIG. 7B, the first line is read from left to right. This continues such that a display raster is formed. Note that the ordering of the data among the three channels is different for each of the three rows shown in FIGS. 7A, 7B and 7C. This pattern repeats every three rows.

The half-pixel interpolator always accesses luminance data to obtain blocks that are 17 pixels by 9 lines and accesses chrominance data in two blocks—one for the Cb values and one for the Cr values—that are each 9 pixels by 5 lines. The 17 by 9 luminance access allows the half pixel interpolator 314 (shown in FIG. 3A) to produce 16 by 8 blocks of pixels with one-half pixel resolution. This 16 by 8 block corresponds to a field macroblock of luminance pixel values. In the same way, the 9 by 5 chrominance blocks are sued to generate 8 by 4 field macroblocks of pixels for the chrominance signals (Cb and Cr).

FIG. 10 illustrates how the memory is accessed to obtain the 17 by 9 block of luminance pixels. To access 17 consecutive luminance pixel values, data from three channels is needed. FIG. 9 shows that the data can have any of three possible channel orders (A,B,C), (B,C,A), (C,A,B) in any memory row. Using the row shown in FIG. 7A, as an example, the data shown as item 902 of FIG. 9 may be obtained as the two columns in item 702 and the one column of item 708. The desired 17 by 9 block of pixels lies entirely within the fetched 24 by 9 block of pixels and it is accessed by the processor 314 (shown in FIG. 3A) from the fetched. The corresponding two 9 pixel by 5 line blocks of chrominance information lie entirely within a 24 pixel by 10 line data block which may be fetched from the data items 704 and 706, shown in FIG. 7A.

The particular addressing scheme shown in FIGS. 7A, 7B and 7C also has advantages when a reference macroblock to be accessed is split across multiple memory rows. This may occur, for example, in motion compensation processing because the forward and backward reference blocks are not constrained to block boundaries as they are stored in their respective fields. Indeed, a reference block may occur at any location in the frame to a resolution of one-half of one pixel position. FIGS. 10A and 10B illustrate two different situations, one in which two 9-pixel by 5-line sets of chrominance values is split across four memory rows and one in which a 17-pixel by 9-pixel set of luminance values is split across four memory rows.

Because, as described above with reference to the memory system shown in FIG. 2C, the address for each of the three channels may be specified separately, and, because of the continuity of data across memory row boundaries, either of these situations may be handled with at most two memory accesses. Furthermore, due to the vertical interleaving of the addresses in the memory devices, these two memory accesses may be pipelined to decrease the amount of time needed to fetch the data relative to two fetch requests which cannot be pipelined. For the example shown in FIG. 10A, the block 1010 is accessed in two memory operations, the first operation sets the address for channel B to (D0, R1) and sets the address for channel C to (D0, R0). Channel A also has a memory access which may be either to (D0, R0) or (D0, R1). Because the data from channel A is not needed to recover the 9 by 5 sets of chrominance pixels, it is discarded. The second memory operation used to access the chrominance data sets assigns (D1, R1) as the address for channel B and assigns (D1, R0) as the address for channel C. Again, in this instance a dummy access is made on the A channel either to (D1, R0) or to (D1, R1). These requests recover the data shown in the block 1010. It is noted that the block 1010 contains ten lines, each containing two octbytes. Ten lines are needed because the Cb and Cr chrominance values are interleaved in the memory 212, as shown in FIG. 8.

The two accesses used to obtain the 17 by 9 block of pixel values contained in the data set 1012 of FIG. 10B are the same as for the chrominance samples. The first access sets the addresses of channels A, B and C to (D0,R0), (D0,R0) and (D0,R1), respectively. The second access sets these addresses to (D1,R0), (D1,R0) and (D1,R1), respectively. These requests recover the data shown in the block 1012.

In the exemplary embodiment of the invention, the blocks of pixels 1010 and 1012 are transferred from the memory 212 to the half pixel interpolate and motion prediction processor 314, responsive to the motion vector information for the macroblock that is currently being processed. The processor 314 (shown in FIG. 3A) then selects the appropriate portions of the blocks 1012 and 1010 which correspond to the 17 by 9 luminance pixel block and the two 9 by 5 chrominance pixel blocks.

Because the two memory accesses for both the chrominance data and the luminance data are to separate devices within the memory 212—the first memory access to device 0 on each of the channels, and the second memory access to device 1 on each of the channels—the pretouch feature of the RAMBUS system may be used to decrease the amount of time used to access the data relative to two independent memory requests. The pretouch feature allows data within memory rows that are in respectively different ones of the devices 244 and 246 (shown in FIG. 2C) to be accessed at much higher speed than data within memory rows that use the same device.

Disregarding, for the moment, the pretouch feature, the general procedure for accessing a memory row uses the following steps, first a memory access request for the addressed row is made by specifying a device, a bank within the device, and a row within the bank as a part of the address. If the device, bank and row portions of this address are the same as the row that was just previously accessed, an acknowledge (ACK) signal is received and data may be transferred. If, however, the requested row is not the same as the last accessed row, then a negative acknowledge (NAK) is received and the memory 212 starts an internal setup operation in the logic circuitry 242 (shown in FIG. 2C) which fetches the addressed data from the new row. If, after the setup operation is complete, a second request is presented, it is answered with an ACK and the requested data.

In the RAMBUS system, these random requests may be pipelined if they are to respectively different ones of the devices 244 and 246. Accordingly, a desirable method for requesting two rows such as 1002 and 1006 of FIG. 10A, which have different device numbers, is to request the first row and, after receiving the NAK, immediately request the second row. This request will also be answered with a NAK. Because the requests are made to separate devices, however, the individual logic circuits 242 of the two devices 244 and 246 (shown in FIG. 2C) are processing the requests in parallel. When, however, the first row is requested again it is answered by an ACK and the requested data. After this data has been transferred, an immediate second request for the second row is also answered by an ACK and the requested data. This sequence of events occurs because the setup for device 244 can occur at the same time that data is being provided from device 246. The total time used for this double request to rows in different devices is approximately 650 ns.

The memory mapping shown in FIG. 7E can be used in the same way with the memory system shown in FIGS. 2B and 2C. Using this mapping scheme, contiguous luminance data for the image, both horizontally and vertically is stored in some sequential permutation of the memory channels A, B and C and contiguous chrominance data is also stored in a sequential permutation of the three channels. These permutations are arranged, however, such that luminance data and its corresponding chrominance data may be accessed in a single memory operation using all three of the channels.

The memory scheme presented above is advantageous because it allows data representing image fields to be stored and fetched in several different ways. It may be stored in a format compatible with the MPEG-2 macroblock format and yet accessed in half-macroblocks of 16 by 8 pixels or 17 by 9 pixels in at most two memory requests. It may also be accessed in a format which aids in block to raster conversion.

While the invention has been described in terms of an exemplary embodiment, it is contemplated that it may be practiced as outlined above within the spirit and scope of the appended claims.

The invention claimed is:

1. A video memory system for storing video image data including luminance and chrominance image component signals, the system comprising:
 a memory having first and second partitions each partition including a plurality of memory rows, each memory row having a plurality of sections and each partition having a respective channel for accessing data in the partition; and
 an address generator including:
  means for assigning each of the luminance and chrominance image component signals to one of the first and second channels, wherein the channel assignment is permuted for consecutive ones of the memory rows into which the video image data is stored; and means for assigning the luminance and chrominance image components to respectively different sections of one of the memory rows when both the luminance and chrominance image components are stored into the one memory row.

2. A system according to claim 1 wherein each of the luminance and chrominance image component signals includes a plurality of blocks representing adjacent groups of picture elements on the video image represented by the video image data, and the address generator further includes:

means for assigning consecutive ones of said blocks of a single one of said luminance and chrominance image component signals to corresponding sections of corresponding memory rows in respectively different ones of said memory partitions.

3. A video memory system for storing, video image data including luminance and chrominance image component signals, the system comprising:

a memory having first, second and third partitions each partition including a plurality of memory rows, each memory row having a plurality of sections and each partition having a respective channel for accessing data in the partition; and an address generator including:

means for assigning the luminance image component signal to two consecutive ones of the first, second and third channels and for assigning the chrominance image component signal to the remaining one of the first, second and third channels, wherein the channel assignment is permuted for consecutive ones of the memory rows into which the video image data is stored; and means for assigning the luminance and chrominance image components to respectively different sections of one of the memory rows when both the luminance and chrominance image components are stored into the one memory row.

4. A system according to claim 3 wherein each of the luminance and chrominance image component signals includes a plurality of blocks representing adjacent groups of picture elements on the video image represented by the video image data, and the address generator further includes:

means for assigning consecutive ones of said blocks of a single one of said luminance and chrominance image component signals to corresponding sections of corresponding memory rows in respectively different ones of said memory partitions.

5. A video memory system according to claim 4, wherein:

each partition of said memory includes first and second devices, each device holding a plurality of said memory rows; and blocks representing vertically adjacent groups of pixels in the image represented by the video image data are stored in respectively different ones of the devices of a single one of said memory rows.

6. A video memory system for storing video image data including first and second image component signals, each of the first and second image component signals including a plurality of blocks representing adjacent picture elements on the video image represented by the video image data, the system comprising:

a memory having first, second and third partitions each partition including a plurality of memory rows, each partition of the memory including first and second devices each device holding a plurality of said memory rows, each memory row having a plurality of sections and each partition having a respective channel for accessing data in the partition; and an address generator including:

means for assigning the first image component signal to two consecutive ones of the first, second and third channels and for assigning the second image component signal to the remaining one of the first, second and third channels;

means for assigning the first and second image components to respectively different sections of one of the memory rows when both the first and second image components are stored into the one memory row; and means for assigning consecutive ones of said blocks of a single one of the first and second image component signals to corresponding sections of corresponding memory rows in respectively different ones of said memory partitions, wherein blocks representing vertically adjacent groups of pixels in the image represented by the video image data are stored in respectively different ones of the devices of a single one of said memory rows, and the blocks are macroblocks, each macroblock including four groups of picture elements of the first image component signal and two groups of picture elements of the second image component signal, and wherein each group of picture elements in one of the macroblocks is stored into a one of the memory rows using a respectively different one of the first, second and third channels, the four groups of picture elements of the first image component signal being stored in a first contiguous address space of the memory row and the two groups of picture elements of the second image component being stored in a second contiguous address space which second address space is displaced in the one memory row from the first contiguous address space.

7. A video memory system according to claim 3, wherein:

the memory includes first, second and third memory elements corresponding to the first, second and third partitions, each memory element including first and second devices;

the address generator includes:

a device address generator which produces an address value which indicates a particular picture element location in a device; and a device selection circuit which selects one of the devices to receive the address value in each one of the memory elements.

8. A video memory system according to claim 7, wherein:

each device of each memory element includes first and second memory banks; and the address generator further includes:

a bank selection circuit which selects one of the banks in the selected device to receive the address value in each one of the memory elements.

9. A video memory system according to claim 7, wherein the device address generator further includes summing means for selectively adding a displacement value to the device address to generate a displaced device address which is applied to one of the memory elements responsive to a control signal.

10. A video memory system for storing video image data including first and second image component signals, the system comprising:

a memory including first, second and third memory elements, each memory element including first and second devices, said memor elements corresponding to first second and third partitions, each partition including a plurality of memory rows, each memory row having a plurality of sections and each partition having a respective channel for accessing data in the partition; and an address generator including:
   means for assigning the first image component signal to two consecutive ones of the first, second and third channels and for assigning the second image component signal to the remaining one of the first, second and third channels;
   means for assigning the first and second image components to respectively different sections of one of the memory rows when both the first and second image components are stored into the one memory row;
   a device address generator for producing an address value which indicates a particular picture element location in a device;
   a device selection circuit which selects one of the devices to receive the address value in each one of the memory elements; and
   summing means for selectively adding a displacement value to the device address to generate a displaced device address which is applied to one of the memory elements responsive to a control signal, wherein the three memory elements are arranged in a cyclic order and the device address generator applies the device address to the first two memory elements in the cycle and the displaced device address to the third memory element in the cycle and, wherein the starting position in the cycle advances by two positions in consecutive ones of the memory rows.

11. A method of storing video image data including luminance and chrominance image component signals into a memory having first and second partitions wherein each partition is coupled to a respective channel for accessing data in the partition, the method comprising the steps of:

defining a plurality of memory rows in each of the first and second partitions, each memory row having a plurality of sections; and generating address values for the memory including the steps of:

assigning each of the luminance and chrominance image component signals to one of the first and second channels, wherein the channel assignment is permuted for consecutive ones of the memory rows into which the video image data is stored;

assigning the luminance and chrominance image components to respectively different sections of one of the memory rows when both the luminance and chrominance image components are stored into the one memory row; and assigning the luminance and chrominance image components to a single section of one of the memory rows when one of the luminance and chrominance image components are stored into the one memory row.

* * * * *

UNITED STATES PATENT AND TRADE MARK OFFICE
CERTIFICATE OF CORRECTION

PATENT NO.    : 5,920,352
DATED         : July 6, 1999
INVENTOR(S)   : Shuji Inoue It is certified that error appears in the above-identified patent and that said Letters Patent is hereby corrected as shown below:

In column 17, line 3, of the Letters Patent, "memor" should read --memory--

Signed and Sealed this

Twenty-seventh Day of February, 2001

*Attest:*

NICHOLAS P. GODICI

*Attesting Officer*   *Acting Director of the United States Patent and Trademark Office*